(12) United States Patent
Ko et al.

(10) Patent No.: US 12,732,605 B2
(45) **Date of Patent: *Sep. 8, 2026**

(54) IMAGE ENCODING/DECODING METHOD AND TRANSMITTING METHOD FOR BITSTREAM BASED ON INTRA PREDICTION

(71) Applicant: LX Semicon Co., Ltd., Daejeon (KR)

(72) Inventors: Hyun Suk Ko, Daejeon (KR); Sung Chang Lim, Daejeon (KR); Jung Won Kang, Daejeon (KR); Dong San Jun, Daejeon (KR); Seung Hyun Cho, Daejeon (KR); Jin Ho Lee, Daejeon (KR); Ha Hyun Lee, Daejeon (KR); Hui Yong Kim, Daejeon (KR); Jin Soo Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/887,748

(22) Filed: Sep. 17, 2024

(65) Prior Publication Data

US 2025/0016310 A1 Jan. 9, 2025

Related U.S. Application Data

(63) Continuation of application No. 18/185,899, filed on Mar. 17, 2023, now Pat. No. 12,126,798, which is a (Continued)

(30) Foreign Application Priority Data

Jan. 2, 2017 (KR) ........................ 10-2017-0000205

(51) Int. Cl.

*H04N 19/159* (2014.01)
*H04N 19/11* (2014.01)

(Continued)

(52) U.S. Cl.

CPC ........... *H04N 19/11* (2014.11); *H04N 19/119* (2014.11); *H04N 19/159* (2014.11); *H04N 19/176* (2014.11); *H04N 19/46* (2014.11)

(58) Field of Classification Search

None

See application file for complete search history.

(56) References Cited

U.S. PATENT DOCUMENTS 10,432,968 B2 10/2019 Lee et al.
11,202,063 B2 12/2021 Lee et al.

(Continued)

FOREIGN PATENT DOCUMENTS

CN 102098519 A 6/2011
CN 102648631 A 8/2012

(Continued)

OTHER PUBLICATIONS

Xiang Li et al., "Multi-Type-Tree, Joint Video Exploration Team (JVET) of ITU-T SG 16 WP 3 and ISO/IEC JTC 1/SC 29/WG 11, JVET-D0117," 4th Meeting, Oct. 15-21, 2016, pp. 1-3.

(Continued)

*Primary Examiner* — Jessica M Prince
(74) *Attorney, Agent, or Firm* — Birch, Stewart, Kolasch & Birch, LLP

(57) ABSTRACT

The present invention relates to an image encoding/decoding method and apparatus. The image decoding method according to the present invention may comprise constructing N MPM lists for a current block, wherein N is equal to or greater than 1, deriving an intra prediction mode of the current block based on the N MPM lists, and performing intra prediction for the current block based on the intra prediction mode.

3 Claims, 8 Drawing Sheets

Related U.S. Application Data continuation of application No. 17/502,647, filed on Oct. 15, 2021, now Pat. No. 11,689,716, which is a continuation of application No. 16/471,071, filed as application No. PCT/KR2018/000031 on Jan. 2, 2018, now Pat. No. 11,184,609.

(51) Int. Cl.
*H04N 19/119* (2014.01)
*H04N 19/176* (2014.01)
*H04N 19/46* (2014.01)

(56) References Cited

U.S. PATENT DOCUMENTS 11,451,767 B2* 9/2022 Jun ........................ H04N 19/11
11,902,509 B2 2/2024 Lee et al.
2011/0299788 A1 12/2011 Suzuki et al.
2012/0177113 A1 7/2012 Guo et al.
2012/0243608 A1 9/2012 Yu et al.
2012/0314766 A1 12/2012 Chien et al.
2013/0089149 A1 4/2013 Hayashi et al.
2013/0114668 A1 5/2013 Misra et al.
2013/0114707 A1 5/2013 Seregin et al.
2013/0170546 A1 7/2013 Kim et al.
2013/0243087 A1 9/2013 Lee et al.
2013/0259128 A1 10/2013 Song et al.
2013/0272623 A1 10/2013 Jeon et al.
2013/0301713 A1 11/2013 Cheung et al.
2014/0010305 A1 1/2014 Mironovich et al.
2014/0086323 A1 3/2014 Chuang et al.
2014/0112593 A1 4/2014 Zheng et al.
2014/0219342 A1* 8/2014 Yu .......................... H04N 19/19 375/240.12
2014/0226717 A1* 8/2014 Lim ..................... H04N 19/117 375/240.12
2014/0226912 A1 8/2014 Lee et al.
2014/0314142 A1 10/2014 Oh et al.
2014/0334543 A1 11/2014 Lee et al.
2015/0036743 A1 2/2015 Lee et al.
2015/0358618 A1 12/2015 Kim et al.
2016/0182905 A1 6/2016 Lee et al.
2016/0316201 A1 10/2016 Lee et al.
2016/0373742 A1 12/2016 Zhao et al.
2016/0373769 A1 12/2016 Zhao et al.
2017/0208336 A1 7/2017 Li et al.
2018/0324418 A1 11/2018 Koo et al.
2018/0359487 A1 12/2018 Bang et al.
2019/0104303 A1* 4/2019 Xiu ...................... H04N 19/182
2019/0116381 A1 4/2019 Lee et al.
2019/0182481 A1 6/2019 Lee
2019/0200011 A1 6/2019 Yoo et al.
2019/0222837 A1 7/2019 Lee et al.
2019/0238835 A1 8/2019 Lee
2019/0281285 A1 9/2019 Piao et al.
2019/0306532 A1 10/2019 Ikonin
2019/0327476 A1 10/2019 Lee et al.
2019/0387226 A1 12/2019 Lee
2020/0068194 A1 2/2020 Seregin et al.
2021/0160487 A1 5/2021 Kim et al.
2021/0195189 A1 6/2021 Lee

FOREIGN PATENT DOCUMENTS

CN 102970526 A 3/2013
CN 103200401 A 7/2013
CN 103238333 A 8/2013
CN 103299637 A 9/2013
CN 103636203 A 3/2014
CN 103797792 A 5/2014
CN 103891283 A 6/2014
CN 103959775 A 7/2014
CN 103988506 A 8/2014
CN 104170379 A 11/2014
CN 104521232 A 4/2015
CN 104918056 A 9/2015
CN 105338347 A 2/2016
CN 105340274 A 2/2016
CN 106031176 A 10/2016
JP 2013-141187 A 7/2013
JP 2013-236358 A 11/2013
JP 2015-507903 A 3/2015
KR 10-2011-0098089 A 9/2011
KR 10-2013-0027975 A 3/2013
KR 10-2013-0029693 A 3/2013
KR 10-2013-0099852 A 9/2013
KR 10-2013-0137680 A 12/2013
KR 10-2014-0008503 A 1/2014
KR 10-2014-0037130 A 3/2014
KR 10-2014-0062509 A 5/2014
KR 10-2014-0124443 A 10/2014
KR 10-2015-0115886 A 10/2015
KR 10-2016-0065787 A 6/2016
KR 10-2016-0143588 A 12/2016
KR 10-2016-0146590 A 12/2016
WO WO 2012/124406 A1 9/2012
WO WO 2012/171463 A1 12/2012
WO WO 2013/037489 A1 3/2013
WO WO 2013/062192 A1 5/2013
WO WO 2014/010943 A1 1/2014
WO WO 2014/123650 A1 8/2014
WO WO 2016/153146 A1 9/2016

OTHER PUBLICATIONS

International Preliminary Report on Patentability in International Appln. No. PCT/KR2018/000031, issued on Jul. 2, 2019, 15 pages (with English translation).
International Search Report issued on Apr. 6, 2018 in counterpart International Patent Application No. PCT/KR2018/000031 (2 pages in English and 2 pages in Korean).
Samuelsson et al., "EE5: Improved MV coding," Joint Video Exploration Team (JVET) of ITU-T SG WP 3 and ISO/IEC JTC 1/SC 29/WG 11, 4th Meeting: Chengdu, China, Oct. 15-21, 2016, JVET-D0062, 7 pages.
Seregin et al., "Neighbor based intra most probable modes list derivation," Joint Video Exploration Team (JVET) of ITU-T SG 16 WP 3 and ISO/IEC JTC 1/SC 29/WG 11 3rd Meeting: Geneva, CH, May 26-Jun. 1, 2016, JVET-C0055, ver. 2, 4 pages.
U.S. Office Action for U.S. Appl. No. 19/028,357, dated Jan. 30, 2026.
Chang et al., "EE6: Arbitrary Reference Tier for Intra Directional Modes, with Supplementary Results," Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.
Chinese Office Action and Search Report for Chinese Application No. 202311025348.1, dated Apr. 23, 2026, with English translation.
Chinese Office Action and Search Report for Chinese Application No. 202311030723.1, dated Apr. 23, 2026, with English translation.
Chinese Office Action and Search Report for Chinese Application No. 202311317965.9, dated Jun. 4, 2026, with English translation.
Chinese Office Action and Search Report for Chinese Application No. 202311321681.7, dated Apr. 29, 2026, with English translation.
Chinese Office Action and Search Report for Chinese Application No. 202311322207.6, dated May 27, 2026, with English translation.
Chinese Office Action and Search Report for Chinese Application No. 202311322546.4, dated May 25, 2026, with English translation.
Chinese Office Action and Search Report for Chinese Application No. 202311324258.2, dated May 12, 2026, with English translation.
Chinese Office Action and Search Report for Chinese Application No. 202311324339.2, dated May 19, 2026, with English translation.
Chinese Office Action and Search Report for Chinese Application No. 202311324731.7, dated May 6, 2026, with English translation.
Chinese Office Action and Search Report for Chinese Application No. 202311329255.8, dated May 6, 2026, with English translation.
Chinese Office Action and Search Report for Chinese Application No. 202311330288.4, dated Apr. 28, 2026, with English translation.
Chinese Office Action and Search Report for Chinese Application No. 202311330872.X, dated Apr. 24, 2026, with English translation.

(56) References Cited

OTHER PUBLICATIONS

Chinese Office Action and Search Report for Chinese Application No. 202311330880.4, dated May 1, 2026, with English translation.
Li et al., "Multiple line-based intra prediction," Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-6.
U.S. Notice of Allowance for U.S. Appl. No. 19/028,357, dated May 20, 2026.
U.S. Office Action for U.S. Appl. No. 18/364,293, dated Jun. 3, 2026.

* cited by examiner

FIG. 8

| 1 | 2 | 3 | 4 |
|---|---|---|---|
| 5 | 6 | 7 | 8 |
| 9 | 10 | 11 | 12 |
| 13 | 14 | 15 | 16 |

(a)

(b)

IMAGE ENCODING/DECODING METHOD AND TRANSMITTING METHOD FOR BITSTREAM BASED ON INTRA PREDICTION

CROSS REFERENCE TO RELATED APPLICATIONS

This application is a Continuation Application of U.S. patent application Ser. No. 18/185,899 filed Mar. 17, 2023 (now U.S. Pat. No. 12,126,798 issued on Oct. 22, 2024), which is a Continuation Application of U.S. patent application Ser. No. 17/502,647, filed on Oct. 15, 2021 (now U.S. Pat. No. 11,689,716 issued on Jun. 27, 2023), which is a Continuation Application of U.S. patent application Ser. No. 16/471,071, filed on Jun. 19, 2019 (now U.S. Pat. No. 11,184,609 issued on Nov. 23, 2021), which is a U.S. National Stage Application of International Application No. PCT/KR2018/000031, filed on Jan. 2, 2018, which claims the benefit under 35 USC 119(a) and 365(b) of Korean Patent Application No. 10-2017-0000205, filed on Jan. 2, 2017, in the Korean Intellectual Property Office. The entire disclosures of these prior applications are incorporated herein by reference for all purposes.

BACKGROUND

1. Field

The present invention relates to a method and apparatus for encoding/decoding an image. Particularly, the present invention relates to a method and apparatus for encoding/decoding an image using intra prediction and a recording medium storing a bitstream generated by an image encoding method/apparatus of the present invention.

2. Description of Related Art

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Technical Problem

An object of the present invention is to provide a method and apparatus for encoding and decoding an image to enhance compression efficiency and a recording medium storing a bitstream generated by an image encoding method/apparatus of the present invention.

Another object of the present invention is to provide a method and apparatus for encoding and decoding an image using intra prediction to enhance compression efficiency and a recording medium storing a bitstream generated by an image encoding method/apparatus of the present invention.

Another object of the present invention is to provide a method and apparatus for encoding and decoding an image performing intra prediction using a plurality of Most Probable Mode (MPM) lists and a recording medium storing a bitstream generated by an image encoding method/apparatus of the present invention.

Technical Solution

An image decoding method according to the present invention may comprise constructing N MPM lists for a current block, wherein N is equal to or greater than 1, deriving an intra prediction mode of the current block based on the N MPM lists, and performing intra prediction for the current block based on the intra prediction mode.

In the image decoding method according to the present invention, the N MPM lists may comprise at least one among an MPM list of the current block, an MPM list of an upper level block of the current block and an MPM list of a neighboring block of the current block.

In the image decoding method according to the present invention, the upper level block may have a divisional depth smaller than a divisional depth of the current block and comprise the current block.

In the image decoding method according to the present invention, a divisional depth or a size of the neighboring block may be equal to a divisional depth or a size of the current block, and the neighboring block may be a block neighboring at least one among an upper-left side, an upper side, an upper-right side, a left side and a lower-left side of the current block.

In the image decoding method according to the present invention, the N MPM lists may be constructed according to a predetermined order, and the predetermined order may be determined based on an encoding parameter of the current block.

In the image decoding method according to the present invention, an MPM flag may be decoded for at least a part of the N MPM lists, and the MPM flag may indicate whether the intra prediction mode of the current block is included in the corresponding MPM list.

In the image decoding method according to the present invention, in case an MPM flag for a K-th (K is an integer equal to or greater than 1 and equal to or smaller than N−1) MPM list in the predetermined order has a first value, MPM flags for MPM lists after the K-th may be not decoded.

In the image decoding method according to the present invention, a variable length code of an MPM flag for an MPM list constructed earlier in the predetermined order may be shorter than a variable length code of an MPM flag for an MPM list constructed later in the predetermined order.

In the image decoding method according to the present invention, in case the MPM flag for the K-th MPM list has the first value, an MPM index may be decoded, and the MPM index may indicate the intra prediction mode of the current block among MPM candidate modes included in the K-th MPM list.

The image encoding method according to the present invention may comprise determining an intra prediction mode of a current block, constructing N MPM lists for the current block, wherein N is equal to or greater than 1, and encoding the intra prediction mode of the current block based on the N MPM lists.

In the image encoding method according to the present invention, the N MPM lists may comprise at least one among an MPM list of the current block, an MPM list of an upper level block of the current block and an MPM list of a neighboring block of the current block.

In the image encoding method according to the present invention, the upper level block may have a divisional depth smaller than a divisional depth of the current block and comprise the current block.

In the image encoding method according to the present invention, a divisional depth or a size of the neighboring block may be equal to a divisional depth or a size of the current block, and the neighboring block may be a block neighboring at least one among an upper-left side, an upper side, an upper-right side, a left side and a lower-left side of the current block.

In the image encoding method according to the present invention, the N MPM lists may be constructed according to a predetermined order, and the predetermined order may be determined based on an encoding parameter of the current block.

In the image encoding method according to the present invention, an MPM flag may be encoded for at least a part of the N MPM lists, and the MPM flag may indicate whether the intra prediction mode of the current block is included in the corresponding MPM list.

In the image encoding method according to the present invention, in case an MPM flag for a K-th (K is an integer equal to or greater than 1 and equal to or smaller than N−1) MPM list in the predetermined order has a first value, MPM flags for MPM lists after the K-th may be not encoded.

In the image encoding method according to the present invention, a variable length code of an MPM flag for an MPM list constructed earlier in the predetermined order may be shorter than a variable length code of an MPM flag for an MPM list constructed later in the predetermined order.

In the image encoding method according to the present invention, in case the MPM flag for the K-th MPM list has the first value, an MPM index may be encoded, and the MPM index may indicate the intra prediction mode of the current block among MPM candidate modes included in the K-th MPM list.

A computer-readable recording medium according to the present invention may store a bitstream generated by an image encoding method of the present invention.

Advantageous Effects

According to the present invention, an image encoding/decoding method and apparatus of improved compression efficiency and a recording medium storing a bitstream generated by an image encoding method/apparatus of the present invention may be provided.

And, according to the present invention, an image encoding/decoding method and apparatus using intra prediction of improved compression efficiency and a recording medium storing a bitstream generated by an image encoding method/apparatus of the present invention may be provided.

And, according to the present invention, an image encoding/decoding method and apparatus performing intra prediction using a plurality of MPM lists and a recording medium storing a bitstream generated by an image encoding method/apparatus of the present invention may be provided.

BRIEF DESCRIPTION OF THE DRAWINGS

FIG. 8 is a view depicting an embodiment of constructing a reference sample for a sub-block included in a current block.

DETAILED DESCRIPTION

Figure 1:
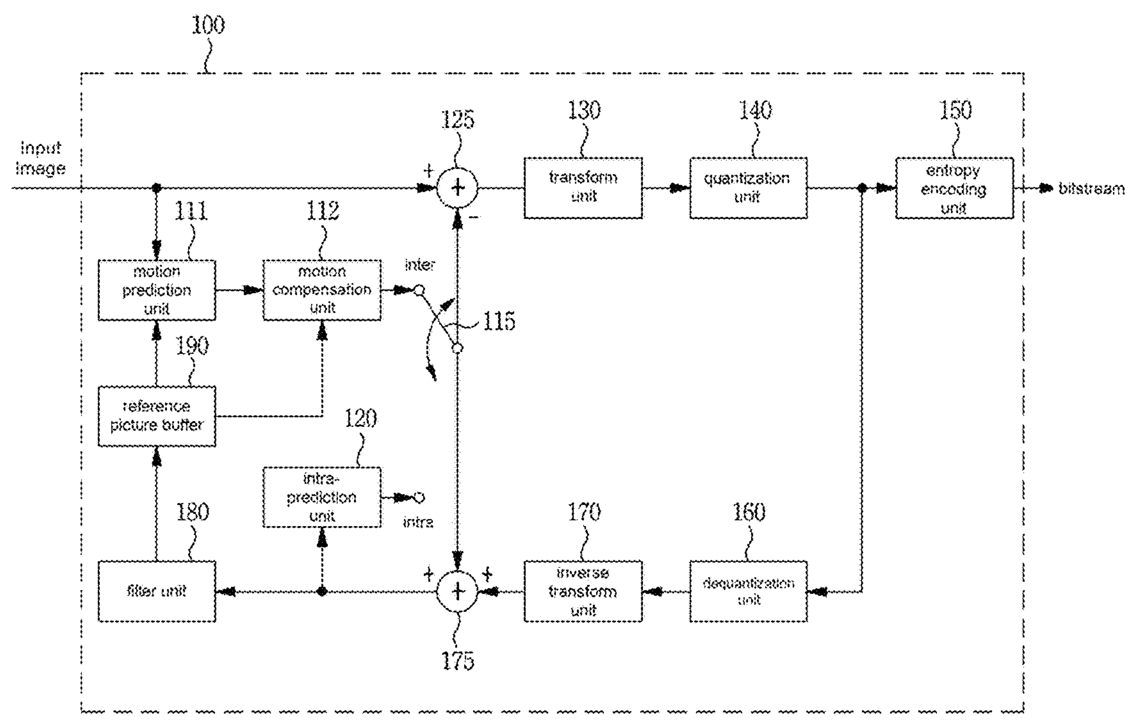
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture", "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method and a binary-tree partitioning method to configure a lower unit such as coding unit, prediction unit, transform unit, etc. It may be used as a term for designating a sample block that becomes a process unit when encoding/decoding an image as an input image.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction. Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a transform coefficient level by a factor. A transform coefficient may be generated by scaling a transform coefficient level. The scaling also may be referred to as dequantization.

Quantization Parameter: may mean a value used when generating a transform coefficient level of a transform coefficient during quantization. The quantization parameter also may mean a value used when generating a transform coefficient by scaling a transform coefficient level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level, the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), a prediction mode (intra prediction or inter prediction), an intra-prediction mode/direction, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an inter-prediction mode, motion information, a motion vector, a reference picture index, a inter-prediction angle, an inter-prediction indicator, a prediction list utilization flag, a reference picture list, a reference picture, a motion vector predictor candidate, a motion vector candidate list, whether to use a merge mode, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a transform coefficient, a transform coefficient level, a quantized level, a transform coefficient level scanning method, an image displaying/outputting sequence, slice identification information, a slice type, slice partition information, tile identification information, a tile type, tile partition information, a picture type, a bit depth, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
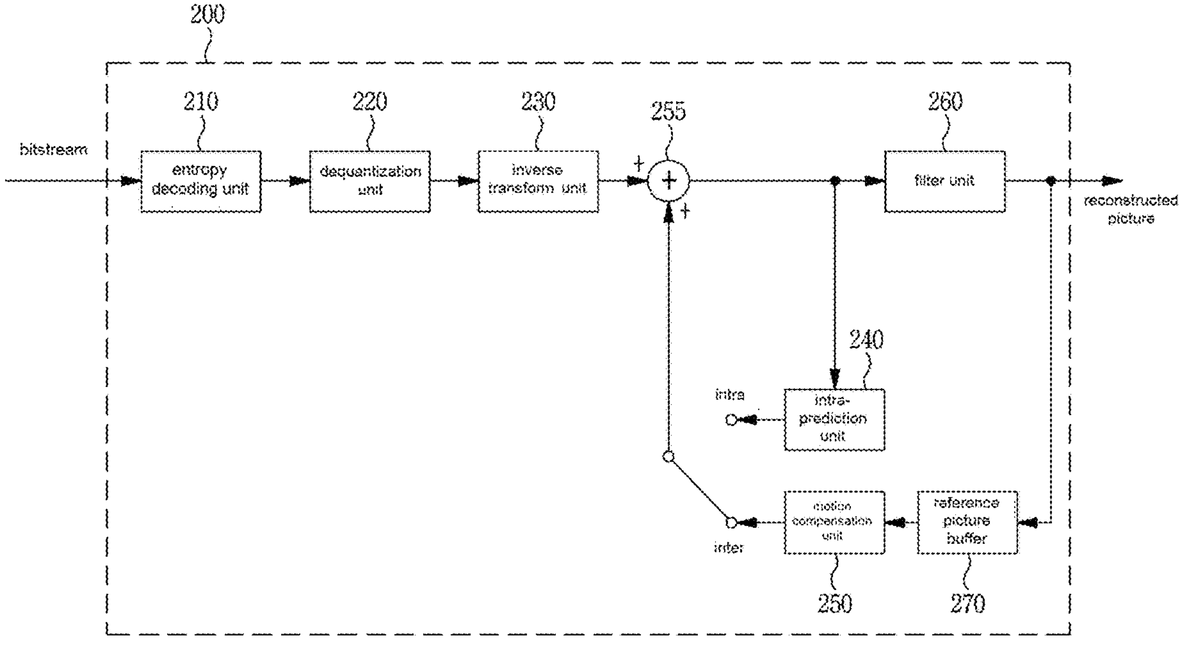
FIG. 2 is a block diagram showing configurations of a decoding apparatus according to an embodiment of the present invention.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level, the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
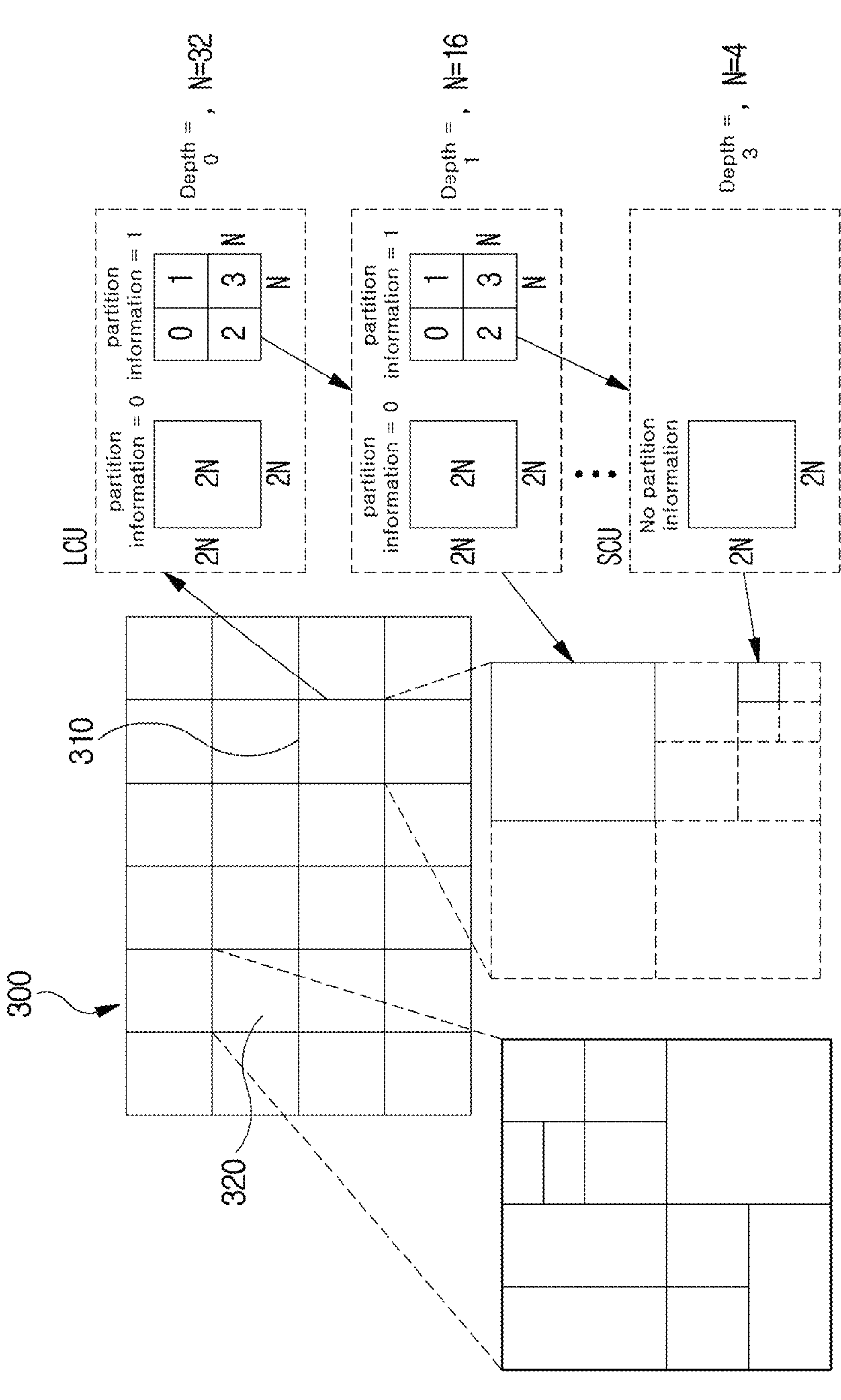
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2 N×2 N. Also, in case of a CU which is partitioned, a CU with a size of 2 N×2 N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when a single coding unit is partitioned into two coding units, a horizontal or vertical size of the two coding units may be a half of a horizontal or vertical size of the coding unit before being partitioned. For example, when a coding unit having a 32×32 size is partitioned in a vertical direction, each of two partitioned coding units may have a size of 16×32. When a single coding unit is partitioned into two coding units, it may be called that the coding unit is partitioned in a binary-tree form. An LCU 320 of FIG. 3 is an example of an LCU to which both of partitioning of a quad-tree form and partitioning of a binary-tree form are applied.

Figure 4:
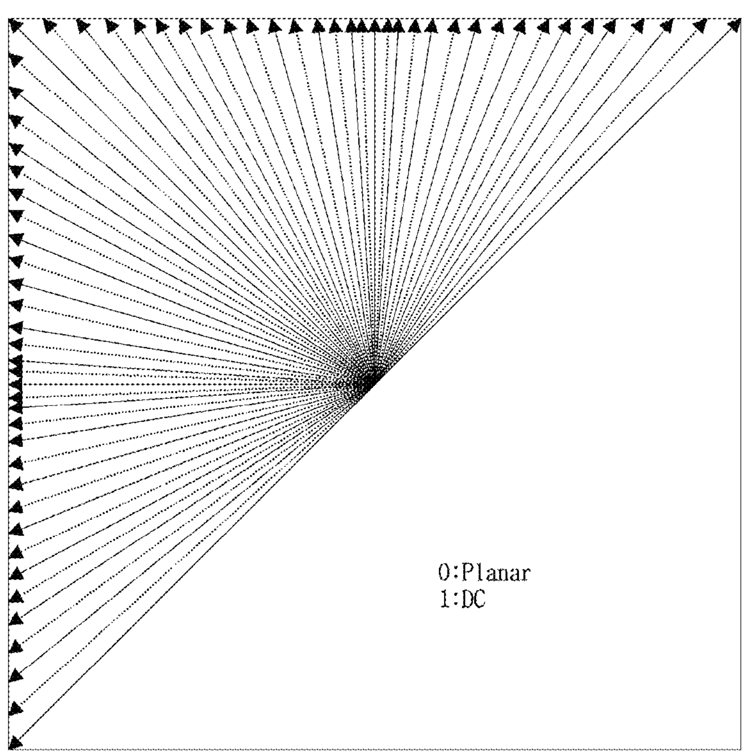
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
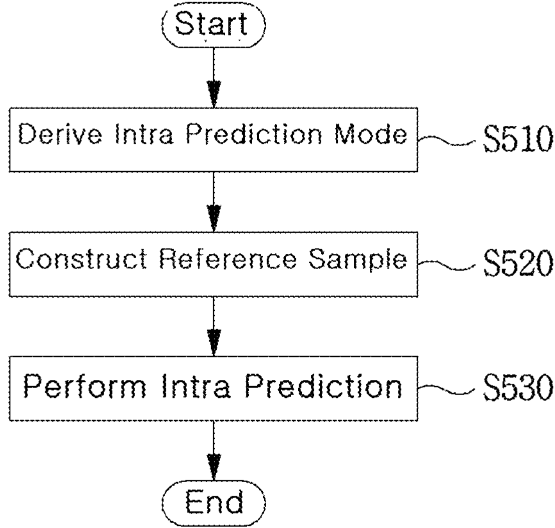
FIG. 5 is a view illustrating a method of performing intra prediction on a current block according to an embodiment of the present invention.

FIG. 5 is a view illustrating a method of performing intra prediction on a current block according to an embodiment of the present invention.

As shown in FIG. 5, intra prediction may include an intra-prediction mode inducement step S510, a reference sample configuration step S520 and/or an intra-prediction execution step S530.

At the intra-prediction mode inducement step S510, the intra-prediction mode of the current block may be induced using at least one of a method of using an intra-prediction mode of a neighbor block, a method of decoding the intra-prediction mode of the current block (e.g., entropy decoding), a method of using an intra-prediction mode of a color component, and/or a method of using an intra-prediction mode using a transform model.

In the method of using the intra-prediction mode of the neighbor block, the intra-prediction mode of the current block may be induced by using at least one of the intra-prediction mode of the neighbor block, a combination of one or more intra-prediction modes of the neighbor block, and/or an intra-prediction mode induced by using MPM lists.

When using MPM lists, intra prediction mode of the current block may be encoded/decoded using at least one among an MPM list of the current block, an MPM list of the upper-layer block and an MPM list of the neighbor block.

At the reference sample configuration step S520, a reference sample selection step and/or a reference sample filtering step may be performed such that a reference sample may be configured.

At the intra prediction execution step S530, at least one method of non-directionality prediction, directionality prediction, location-information-based prediction and/or prediction between color components is used to perform intra prediction of the current block. At the intra prediction execution step S530, filtering for a prediction sample may be executed.

Hereinafter, the intra-prediction mode inducement step S510 will be described in detail.

A neighbor block of the current block may be at least one of lower left, left, upper left, upper, and upper right neighbor blocks of the current block. Among the neighbor blocks, only neighbor blocks that can use the intra-prediction mode may be used.

Among the neighbor blocks of the current block, an intra-prediction mode of a neighbor block at a particular position may be induced as the intra-prediction mode of the current block.

Alternatively, two or more neighbor blocks are selected, a statistic value of intra-prediction modes of the selected neighbor blocks may be induced as the intra-prediction mode of the current block. The intra-prediction mode may be indicated by at least one of a mode number, a mode value, and a mode angle. In the description, the statistic value may be at least one of a minimum value, a maximum value, an average value, a weighted average value, a mode, and a median value.

The neighbor block at the particular position and/or the selected neighbor blocks may be a block(s) at a predefined fixed position. Alternatively, the block(s) may be specified based on information signaled through a bitstream.

When using at least two intra-prediction modes, whether the intra-prediction mode has directionality or non-directionality may be considered. For example, among two or more intra-prediction modes, the intra-prediction mode of the current block may be induced using a directional intra-prediction mode. Alternatively, the intra-prediction mode of the current block may be induced using a non-directional intra-prediction mode.

When the weighted average value is used as the statistic value, a relatively high weight may be assigned to a particular intra-prediction mode. The particular intra-prediction mode may be at least one of, for example, a vertical mode, a horizontal mode, a diagonal mode, a non-directionality mode. Alternatively, information on the particular intra-prediction mode may be signaled through a bitstream. Respective weights of particular intra-prediction modes may be equal to or different from each other. Alternatively, the weight may be determined based on a size of a neighbor block. For example, a relatively high weight may be assigned to an intra-prediction mode of a relatively large neighbor block.

The intra-prediction mode of the current block may be induced using an MPM (Most Probable Mode).

When using the MPM, an MPM list may be configured using N intra-prediction modes induced using the intra-prediction mode of the neighbor block. N is a positive integer, and may have a value that differs depending on a size and/or a shape of the current block. Alternatively, information on N may be signaled through a bitstream.

Intra-prediction modes that may be included in the MPM list may be intra-prediction modes of lower left, left, upper left, upper and/or upper right neighbor blocks of the current block. Also, the non-directionality mode may be included in the MPM list. The intra-prediction modes may be included in the MPM list in a predetermined order. The predetermined order may be, for example, an order of a mode of a lower left block, a mode of an upper block, a Planar mode, a DC mode, a mode of a left block, a mode of an upper right block, and a mode of an upper left block. Alternatively, the predetermined order may be an order of a mode of a left block, a mode of an upper block, a Planar mode, a DC mode, a mode of a left block, a mode of an upper right block, and a mode of an upper left block.

The MPM list may be configured to not include a duplicate mode. When the number of intra-prediction modes included in the MPM list is less than N, an additional intra-prediction mode may be included in the MPM list. The additional intra-prediction mode may be a mode corresponding to +k, −k of the directional intra-prediction mode included in the MPM list. An integer equal to or greater than one may be designated by k. Alternatively, at least one of a horizontal mode, a vertical mode, and a diagonal mode (a 45-degree angle mode, a 135-degree angle mode, and a 225-degree angle mode) may be included in the MPM list. Alternatively, a statistic value of at least one intra-prediction mode of the neighbor block may be used to induce an intra-prediction mode to be included in the MPM list.

There may be several MPM lists, and several MPM lists may be configured in different methods. The intra-prediction mode included in each MPM list may not be duplicated.

Information (e.g., flag information) indicating whether the intra-prediction mode of the current block is included in the MPM list may be signaled through a bitstream. When there are N MPM lists, N pieces of flag information may exist. Determining whether the intra-prediction mode of the current block exits in the MPM list may be performed in order for N MPM lists. Alternatively, information indicating a MPM list including the intra-prediction mode of the current block, among N MPM lists, may be signaled.

When the intra-prediction mode of the current block is included in the MPM list, index information for specifying which mode, among modes included in the MPM list, may be signaled through a bitstream. Alternatively, a mode at a particular position (e.g., the first) of the MPM list may be induced as the intra-prediction mode of the current block.

In configuring the MPM list, one MPM list may be configured for a predetermined-size block. When the predetermined-size block is partitioned into several sub-blocks, each of the several sub-blocks may use the configured MPM list.

Alternatively, the intra-prediction mode of the current block may be induced using at least one of the intra-prediction mode of the current block induced using the MPM and the intra-prediction mode of the neighbor block.

For example, when the intra-prediction mode of the current block induced using the MPM is Pred_mpm, the Pred_mpm is changed into a predetermined mode by using at least one intra-prediction mode of the neighbor block such that the intra-prediction mode of the current block may be induced. For example, the Pred_mpm may be increased or decreased by N by being compared with the size of the intra-prediction mode of the neighbor block. Here, N may be a predetermined integer, such as, +1, +2, +3, 0, −1, −2, −3, etc.

Alternatively, when one of the Pred_mpm and a mode of the neighbor block is the non-directionality mode and the other one is the directionality mode, the non-directionality mode may be induced as the intra-prediction mode of the current block or the directionality mode may be induced as the intra-prediction mode of the current block.

In the case where the intra prediction mode of a current block is derived using a Most Probable Mode (MPM) list, for example, at least one of the following MPM lists may be used. Or the intra prediction mode of the current block may be entropy-encoded/decoded.

An MPM list for a current block.

At least one of MPM lists for upper-layer blocks of a current block.

At least one of MPM lists for neighbor blocks of a current block.

Information required to make an MPM list, such as whether the MPM list of the current block is used, whether at least one of the MPM lists of the upper-layer blocks of the current block is used, and whether at least one of the MPM lists of the neighbor blocks of the current block is used, may be entropy-encoded/decoded in at least one of a video parameter set (VPS), a sequence parameter set (SPS), a picture parameter set (PPS), an adaptation parameter set (APS), a slice, a header, a tile, a CTU, a CU, a PU, and a TU.

An upper-layer block may be a block having a smaller depth value than the current block. In addition, the upper-layer block may refer to at least one of blocks including the current block among blocks having the smaller depth values. Herein, a depth value may mean a value that is increased by 1 each time a block is divided. For example, the depth value of an undivided CTU may be 0.

Further, the upper-layer block may mean one or a combination of one or more of the following embodiments. If a first block is an upper-layer block and a second block is the current block, the first block may include the second block. Herein, the first block may be a block less deep than the second block. Herein a less deep block may refer to a block having a smaller depth value. Or the first block may refer to a block larger in size than the second block. Herein, a larger block may be a less deep block.

Information indicating at least one of the size or depth of the first block may be signaled by the encoder. The information may be signaled at the level of at least one of a VPS, an SPS, a picture, a slice, a tile, and a block.

At least one of the size or depth of the first block may be derived based on at least one of the size or depth of the second block. For example, at least one of the size or depth of the first block may be derived based on a value obtained by adding or subtracting a predetermined constant to or from the size (or depth) of the second block (current block). Or, at least one of the size or depth of the first block may have a fixed value preset in the encoder/decoder.

A neighbor block may be at least one of blocks which are spatially and/or temporally neighboring to the current block. The neighbor blocks may have already been encoded/decoded. In addition, the neighbor block may have a depth (or size) equal to or different from that of the current block. The neighbor block may refer to a block at a predetermined position with respect to the current block. Herein, the predetermined position may be at least one of top left, top, top right, left, and bottom left positions with respect to the current block.

Or the predetermined position may be a position within a picture different from a picture to which the current block belongs. A block at the predetermined position may refer to at least one of a collocated block of the current block in the different picture and/or a block neighboring to the collocated block. Or the block at the predetermined position may be a block having the same prediction mode as that of the current block in a specific area of the different picture, corresponding to the current block.

Further, the neighbor block may refer to one or a combination of one or more of the following embodiments. If a first block is a neighbor block and a second block is the current block, the first block is an encoded/decoded block neighboring to the second block. The first block may be a block having a depth equal to that of the second block. The first block may be a block having a size equal to that of the second block.

The first block and the second block may belong to the same coding block (CTU, CU, or the like), or different coding blocks. The depth and/or size of the first block may be different from the depth and/or size of the second block.

The MPM list of the upper-layer block or the neighbor block may refer to an MPM list made based on the upper-layer block or the neighbor block. The intra prediction mode of an encoded/decoded block neighboring to the upper-layer block or the neighbor block may be added to the MPM list of the upper-layer block or the neighbor block.

Figure 6:
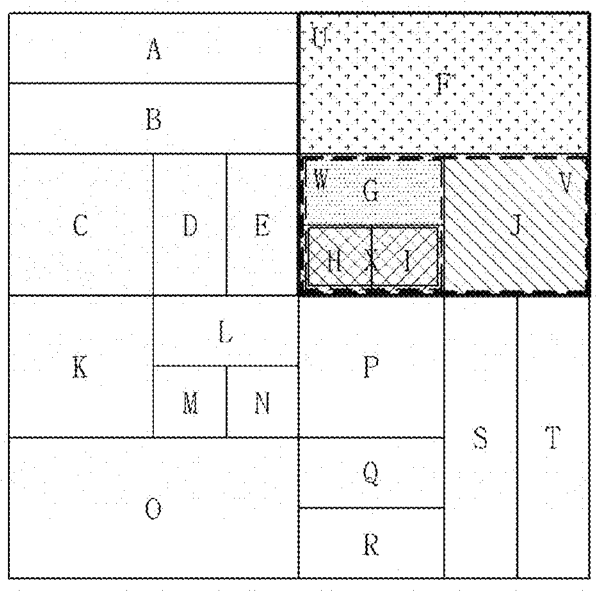
FIG. 6 is an exemplary view depicting a current block, an upper-layer block, and a neighbor block.

FIG. 6 is an exemplary view depicting a current block, an upper-layer block, and a neighbor block.

For example, in FIG. 6, block U (a block marked with a bold solid line) may be an upper-layer block for block F, block G, block H, block I, and block J. In this case, at least one of block F, block G, block H, block I, and block J may be a current block. For example, in FIG. 6, block V (a block marked with a bold dotted line) may be an upper-layer block for block G, block H, block I, and block J. At least one of block G, block H, block I, and block J may be a current block. For example, in FIG. 6, block W (a block marked with a dotted pattern) may be an upper-layer block for block G, block H, and block I. In this case, at least one of block G, block H, and block I may be a current block. For example, in FIG. 6, block X (a block marked with a diamond pattern) may be an upper-layer block for block H and block I. In this case, at least one of block H and block I may be a current block. For example, in FIG. 6, a neighbor block of current block D may be at least one of block B, block C, and block K. For example, in FIG. 6, a neighbor block of current block L may be at least one of block C, block D, block E, block H, and block K. For example, in FIG. 6, a neighbor block of current block P may be at least one of block E, block H, block I, block J, block L, block N, and block O. For example, in FIG. 6, a neighbor block of current block S may be at least one of block I, block J, block P, block Q, and block R.

The intra prediction mode of the current block may be derived or entropy-encoded/decoded, using N MPM lists. Herein, N may be 0 or a positive integer. That is, the intra prediction mode of the current block may be derived or entropy-encoded/decoded, using a plurality of MPM lists. In addition, a plurality of MPM lists may refer to multiple MPM lists or multiple lists. N MPM lists for the current block may include at least one of an MPM list of the current block, an MPM list of an upper-layer block, and an MPM list of a neighbor block.

Further, the N MPM lists may be generated, using at least one of coding parameters for the current block.

Further, at least one of sub-blocks of a predetermined block may be the current block. In this case, an upper-layer block of the sub-blocks may be the predetermined block. Herein, the sub-blocks may be included in the predetermined block. Further, the sub-blocks may be blocks divided from the predetermined block. Further, at least one of sub-blocks that do not correspond to the current block among the sub-blocks divided from the predetermined block may be a neighbor block of the current block. Herein a sub-block may mean a lower-layer block in the sense opposite to an upper-layer block.

For example, if the current block is block H in FIG. 6, a plurality of MPM lists for the current block may be made in at least one of the following methods. The plurality of MPM lists may include at least one of an MPM list made based on the current block, and an MPM list made based on an upper-layer block of the current block.

For example, in FIG. 6, an MPM list made based on upper-layer block X may be used for current block H. For example, in FIG. 6, an MPM list made based on upper-layer block W may be used for current block H. For example, in FIG. 6, an MPM list made based on upper-layer block V may be used for current block H. For example, in FIG. 6, an MPM list made based on upper-layer block U may be used for current block H. For example, in FIG. 6, at least one of the MPM lists made based on at least one of upper-layer block X, upper-layer block W, upper-layer block V, and upper-layer block U may be used to derive the intra prediction mode of current block H.

For example, if the current block is block H in FIG. 6, a plurality of MPM lists for the current block may be made in at least one of the following methods. The plurality of MPM lists may include at least one of an MPM list made based on the current block, and an MPM list made based on a neighbor block of the current block.

For example, in FIG. 6, an MPM list made based on neighbor block E may be used for current block H. For example, in FIG. 6, an MPM list made based on neighbor block G may be used for current block H. For example, in FIG. 6, at least one of MPM lists made based on at least one of neighbor block E and neighbor block G may be used for current block H.

The intra prediction mode of the current block may be derived using the made MPM list, or entropy-encoded/decoded.

Use of the MPM list of the upper-layer block or the MPM list of the neighbor block for current block H may imply use of the MPM list of the upper-layer block or the MPM list of the neighbor block in deriving the intra prediction mode of the current block or encoding/decoding the intra prediction mode of the current block.

The plurality of MPM lists for the current block may include MPM lists for N upper-layer blocks. Herein, N is 0 or a positive integer.

Information such as the number, depths, and/or depth ranges of upper-layer blocks, and/or the differences between the depth of the current block and the depths of the upper-layer blocks may be required in making an MPM list for an upper-layer block. The information required to make the MPM list of the upper-layer block may be entropy-encoded/decoded in at least one of a VPS, an SPS, a PPS, an APS, a slice header, a tile header, a CTU, a CU, a PU, and a TU.

For example, if the current block has a depth value of D, an MPM list of an upper-layer block may be made in at least one of the following methods. As described before, the made MPM list of the upper-layer block may be used in deriving the intra prediction mode of the current block or entropy-encoding/decoding the intra prediction mode of the current block. Herein, D is 0 or a positive integer.

For example, an MPM list of an upper-layer block having a depth value of D−1 may be used for the current block. For example, an MPM list of an upper-layer block having a depth value of D−2 may be used for the current block. For example, an MPM list of an upper-layer block having a depth value of D−K may be used for the current block. Herein, K is a positive integer equal to or less than D. For example, MPM lists of upper-layer blocks having depth values ranging from D−1 to D−2 may be used for the current block. For example, MPM lists of upper-layer blocks having depth values ranging from D−1 to D−3 may be used for the current block. For example, MPM lists of upper-layer blocks having depth values ranging from D−1 to D−K may be used for the current block. Herein, K is a positive integer equal to or less than D. For example, MPM lists of upper-layer blocks having depth values ranging from D−K to D−I may be used for the current block. Herein, K and I may be positive integers equal to or less than D. In addition, K may be less than I. For example, if one upper-layer block is used, an MPM list of an upper-layer block having a depth value of D−1 or 0 may be used for the current block. For example, if two upper-layer blocks are used, MPM lists of at least two of upper-layer blocks each having a depth value of 0, 1, D−1 or D−2 may be used for the current block. For example, if K upper-layer blocks are used, MPM lists of at least K upper-layer blocks out of upper-layer blocks having depth values ranging from D−1 to D−K and upper-layer blocks having depth values ranging from 0 to K−1 may be used for the current block. K may be a positive integer less than or equal to D. For example, if K upper-layer blocks are used, MPM lists of K upper-layer blocks with respect to the current block may be used for the current block. K may be a positive integer less than or equal to D.

If a plurality of MPM lists for the current block include MPM lists of upper-layer blocks, the number and/or depth values of the used upper-layer blocks may be derived using information about the size and/or depth of the current block.

For example, if the current block is a W×H block with a depth value of D, the size of the current block may be represented as the number of pixels, W×H. If the number of pixels in the current block is equal to or greater than a predetermined threshold, MPM lists of one or more of upper-layer blocks having depth values ranging from D−1 to D−K may be used for the current block. Herein, K may be a positive integer less than D.

Further, for example, if the number of pixels in the current block is less than the predetermined threshold, MPM lists of one or more of upper-layer blocks having depth values ranging from D−1 to D−L may be used for the current block. Herein, L may be a positive integer larger than K. For example, if the depth value of the current block is D and D is less than or equal to a predetermined depth value, T, MPM lists of one or more of upper-layer blocks having depth values ranging from D−1 to D−K may be used for the current block. K may be a positive integer less than D. For example, if the depth value of the current block, D is larger than T, MPM lists of one or more of upper-layer blocks having depth values ranging from D−1 to D−L may be used for the current block. L may be a positive integer larger than K.

The plurality of MPM lists for the current block may include MPM lists for N neighbor blocks. The N neighbor blocks may include neighbor blocks at predetermined positions. N may be 0 or a positive integer.

Information such as the number N, depth values, sizes, and/or position of the included neighbor blocks may be required to make an MPM list of a neighbor block. The information required to make an MPM list of a neighbor block may be entropy-encoded/decoded in at least one of a VPS, an SPS, a PPS, an APS, a slice header, a tile header, a CTU, a CU, a PU, and a TU. The number and/or positions of the neighbor blocks may be determined variably according to the size, shape, and/or position of the current block. An MPM list of a neighbor block may be made, if the depth value of the neighbor block is a predetermined value or falls within a predetermined range. The predetermined range may be defined by at least one of a minimum value or a maximum value. Information about the at least one of the minimum value or the maximum value may be entropy-encoded/decoded in the afore-described predetermined unit.

For example, in FIG. 6, if the current block is block P and has a depth value of D, a plurality of MPM lists for the current block may be made in at least one of the following methods. Herein, the plurality of MPM lists may include at least one of an MPM list made based on the current block and an MPM list made based on a neighbor block of the current block.

For example, an MPM list made based on left neighbor block L or N of current block P may be used for current block P. For example, an MPM list made based on top left neighbor block E of current block P may be used for current block P. For example, an MPM list made based on bottom left neighbor block O of current block P may be used for current block P. For example, an MPM list made based on top neighbor block H or I of current block P may be used for current block P. For example, an MPM list made based on top right neighbor block J of current block P may be used for current block P. For example, MPM lists of at least two of top left, top, top right, left, and bottom left neighbor blocks of current block P may be used for current block P. For example, MPM lists of at least three of the top left, top, top right, left, and bottom left neighbor blocks of current block P may be used for current block P. For example, MPM lists of at least four of the top left, top, top right, left, and bottom left neighbor blocks of current block P may be used for current block P. For example, MPM lists of at least five of the top left, top, top right, left, and bottom left neighbor blocks of current block P may be used for current block P.

An intra prediction mode derived based on at least one of the current block, the upper-layer block, and the neighbor block may be included in one MPM list for the current block. That is, if not a plurality of MPM lists but a single MPM list is used for the current block, the MPM list may be made up of at least one of intra prediction modes derived based on at least one of intra prediction modes based on at least one of the current block, the upper-layer block, and the neighbor block.

If N MPM lists for the current block include an MPM list for at least one of upper-layer blocks and neighbor block, the order of making the N MPM lists may be determined. Herein, N may be 0 or a positive integer.

The order of making the MPM lists may be preset in the encoder and the decoder. Or, the order of making the MPM lists may be determined based on a coding parameter of each corresponding block. Or, the order of making the MPM lists may be determined based on a coding parameter of the current block. Or, information about the order of making the MPM lists may be entropy-encoded/decoded.

For example, in FIG. 6, the current block may be block H and an MPM list for the current block may be referred to as MPM_LIST_CUR. Also, MPM lists for blocks X, W, V, and U, made based on upper-layer blocks of the current block may be referred to as MPM_LIST_X, MPM_LIST_W, MPM_LIST_V, and MPM_LIST_U, respectively. In addition, MPM lists for blocks L, E, and G, made based on neighbor blocks of the current block may be referred to as MPM_LIST_L, MPM_LIST_E, and MPM_LIST_G, respectively.

The order of making N MPM lists for the current block may be determined in at least one of the later-described methods. The number of upper-layer blocks and/or neighbor blocks used in the later-described methods is a mere example, and thus a different number of upper-layer blocks and/or neighbor blocks are also available.

For example, a plurality of MPM lists may be made for current block H in the order of MPM_LIST_CUR→MPM_LIST_X→MPM_LIST_W→MPM_LIST_V→MPM_LIST_U. For example, a plurality of MPM lists may be made for current block H in the order of MPM_LIST_U→MPM_LIST_V→MPM_LIST_W→MPM_LIST_X→MPM_LIST_CUR. For example, with MPM_LIST_CUR used as the first MPM list, a plurality of MPM lists may be made for current block H, using MPM lists for at least K upper-layer blocks arranged in an ascending or descending order of depth values. Herein, K may be 0 or a positive integer. For example, a plurality of MPM lists may be made for current block H in the order of MPM_LIST_CUR→MPM_LIST_L→

MPM_LIST_G→MPM_LIST_E. For example, a plurality of MPM lists may be made for current block H in the order of MPM_LIST_L→MPM_LIST_G→MPM_LIST_E→MPM_LIST_CUR. For example, with MPM_LIST_CUR used as the first MPM list, a plurality of MPM lists may be made for current block H, using MPM lists for at least one of top left, left, bottom left, top, and top right neighbor blocks in a predetermined order. For example, a plurality of MPM lists may be made for current block H in the order of MPM_LIST_CUR→MPM_LIST_X→MPM_LIST_L. For example, a plurality of MPM lists may be made for current block H in the order of MPM_LIST_CUR→MPM_LIST_L→MPM_LIST_X. For example, a plurality of MPM lists may be made for current block H in the order of MPM_LIST_CUR→MPM lists for K upper-layer blocks in a predetermined order→MPM lists for L neighbor blocks in a predetermined order. Herein, each of K and L may be 0 or a positive integer. For example, a plurality of MPM lists may be made for current block H in the order of MPM_LIST_CUR→MPM lists for L neighbor blocks in a predetermined order→MPM lists for K upper-layer blocks in a predetermined order. Herein, each of K and L may be 0 or a positive integer. For example, a plurality of MPM lists may be made for current block H in the order of MPM_LIST_CUR→MPM lists for at least K ones of upper-layer blocks or neighbor blocks in a predetermined order. Herein, K may be a positive integer. For example, a plurality of MPM lists may be made for current block H, using MPM_LIST_CUR and MPM lists for at least K ones out of upper-layer blocks or neighbor blocks in a predetermined order. Herein, K may be a positive integer.

A following MPM list may not include intra prediction modes of a preceding MPM list in the order. In addition, the variable length code of an indicator for the preceding MPM list may be shorter than the variable length code of an indicator for the following MPM list. In addition, the preceding MPM list may include a smaller number of candidates than the following MPM list. Indicators may be allocated to the MPM lists in the order of making the MPM lists.

N MPM lists for the current block may include an MPM list for at least one of upper-layer blocks and neighbor blocks according to at least one of the orders of making the MPM lists. Herein, a plurality of MPM lists may be made not to include same intra prediction modes redundantly. Herein, N may be 0 or a positive integer.

N MPM lists used for the current block may be denoted by MPM_LIST_1, MPM_LIST_2, . . . MPM_LIST_N. At least one of MPM_LIST_CUR, MPM_LIST_X, MPM_LIST_W, MPM_LIST_V, MPM_LIST_U, MPM_LIST_L, MPM_LIST_E, and MPM_LIST_G may correspond to at least one of MPM_LIST_1, MPM_LIST_2, . . . MPM_LIST_N.

Here, the numbers of intra prediction modes that may be included in the respective MPM lists may be denoted by C1, C2, . . . CN. Each of C1, C2, . . . CN CN may be 0 or a positive integer. A part or all of C1 to CN may be equal or different. In addition, at least one of C1, C2, . . . CN may be predetermined in the encoder and the decoder. In addition, at least one of C1, C2, . . . CN may be determined based on a coding parameter of each corresponding block. In addition, at least one of C1, C2, . . . , CN may be entropy-encoded/decoded.

For example, intra prediction modes included in MPM_LIST_1 may be denoted by MPM_LIST_1_MODE_1, MPM_LIST_1_MODE_2, . . . , MPM_LIST_1_MODE_C1.

To prevent redundant inclusion of the same intra prediction modes in MPM lists, redundancy with intra prediction modes included in a preceding MPM list may be checked using intra prediction modes of a following MPM list in the order. In the presence of a redundant intra prediction mode after the redundancy check, the intra prediction mode may be excluded from an MPM list. After the redundant mode is excluded, a predetermined intra prediction mode may be added to the MPM list.

The redundancy check on the modes included in the MPM lists may be performed in the step of making a plurality of MPM lists. Or, the redundancy check may be performed after all of a plurality of MPM lists are made. Or, the redundancy check may be performed each time an intra prediction mode is included in an MPM list.

For example, if MPM_LIST_1 for the current block includes C1 intra prediction modes, the intra prediction modes of MPM_LIST_1 may be MPM_LIST_1_MODE_1, MPM_LIST_1_MODE_2, . . . , MPM_LIST_1_MODE_C1 which are not redundant.

For example, if MPM_LIST_2 includes C2 non-redundant intra prediction modes, it may be checked whether each intra prediction mode of MPM_LIST_2 is identical to at least one of the intra prediction modes of MPM_LIST_1. If an intra prediction mode MPM_LIST_2_MODE_X included in MPM_LIST_2 is identical to a mode included in MPM_LIST_1, the redundant intra prediction mode, MPM_LIST_2_MODE_X may be excluded from MPM_LIST_2. Herein, MPM_LIST_2_MODE_X may be at least one of MPM_LIST_2_MODE_1, MPM_LIST_2_MODE_2, . . . , MPM_LIST_2_MODE_C2. For example, if at least one intra prediction mode is excluded from MPM_LIST_2, at least one of predetermined intra prediction modes may be included in MPM_LIST_2. The at least one of the predetermined intra prediction modes, included in MPM_LIST_2 may not be redundant with at least one of the intra prediction modes included in MPM_LIST_1. Or, the at least one of the predetermined intra prediction modes, included in MPM_LIST_2 may be redundant with none of the intra prediction modes included in MPM_LIST_1.

The predetermined intra prediction modes added to substitute for redundant prediction modes may include at least one of intra prediction modes including, for example, INTRA_PLANAR, INTRA_DC, horizontal mode, vertical mode, 45-degree mode, 135-degree mode, 225-degree mode, MPM_LIST_2_MODE_X±delta, INTRA_DM, and INTRA_LM. INTRA_DM may refer to an intra prediction mode in which an intra chroma prediction mode is determined to be identical to an intra luma prediction mode. In addition, INTRA_LM may refer to an intra prediction mode in which at least one of a chroma prediction/residual/reconstruction block is generated based on at least one of a luma prediction/residual/reconstruction block. In addition, delta may be a positive integer.

A predetermined intra prediction mode, MPM_LIST_2_MODE_X±delta may be included in MPM_LIST_2, while delta is continuously increased from 1 by 1 each time until the number of intra prediction modes included in MPM_LIST_2 is C2. Or, the predetermined intra prediction modes may be arranged in a predetermined order, and at least one of the predetermined intra prediction modes may be included in MPM_LIST_2 in the order, until the number of intra prediction modes included in MPM_LIST_2 is C2.

For example, if MPM_LIST_3 for the current block includes C3 non-redundant intra prediction modes, it may be checked whether each intra prediction mode included in MPM_LIST_3 is identical to at least one of the intra prediction modes included in MPM_LIST_1 and MPM_LIST_2. If an intra prediction mode MPM_LIST_3_MODE_X included in MPM_LIST_3 is identical to a mode included in MPM_LIST_1 or MPM_LIST_2, the redundant intra prediction mode, MPM_LIST_3_MODE_X may be excluded from MPM_LIST_3. Herein, MPM_LIST_3_MODE_X may be at least one of MPM_LIST_3_MODE_1, MPM_LIST_3_MODE_2, . . . , MPM_LIST_3_MODE_C3. For example, if at least one intra prediction mode is excluded from MPM_LIST_3, at least one of predetermined intra prediction modes may be included in MPM_LIST_3. The at least one of the predetermined intra prediction modes, included in MPM_LIST_3 may not be redundant with at least one of the intra prediction modes included in MPM_LIST_1 and MPM_LIST_2. Or, the at least one of the predetermined intra prediction modes, included in MPM_LIST_3 may be redundant with none of the intra prediction modes included in MPM_LIST_1 and MPM_LIST_2.

For example, a predetermined intra prediction mode, MPM_LIST_3_MODE_X±delta may be included in MPM_LIST_3, while delta is continuously increased from 1 by 1 each time until the number of intra prediction modes included in MPM_LIST_3 is C3. Or, the predetermined intra prediction modes may be arranged in a predetermined order, and at least one of the predetermined intra prediction modes may be included in MPM_LIST_3 in the order, until the number of intra prediction modes included in MPM_LIST_3 is C3.

For example, if MPM_LIST_K for the current block includes CK non-redundant intra prediction modes, it may be checked whether each intra prediction mode included in MPM_LIST_K is identical to at least one of the intra prediction modes included in MPM_LIST_1, MPM_LIST_2, . . . MPM_LIST_(K−1). K may be a positive integer equal to or less than the maximum number N of MPM lists available to the current block. If an intra prediction mode MPM_LIST_K_MODE_X included in MPM_LIST_K is identical to a mode included in MPM_LIST_1, MPM_LIST_2, . . . MPM_LIST_(K−1), the redundant intra prediction mode, MPM_LIST_K_MODE_X may be excluded from MPM_LIST_K. Herein, MPM_LIST_K_MODE_X may be at least one of MPM_LIST_K_MODE_1, MPM_LIST_K_MODE_2, . . . , MPM_LIST_K_MODE_CK.

For example, if at least one intra prediction mode is excluded from MPM_LIST_K, at least one of predetermined intra prediction modes may be included in MPM_LIST_K. The at least one of the predetermined intra prediction modes, included in MPM_LIST_K may not be redundant with at least one of the intra prediction modes included in MPM_LIST_1, MPM_LIST_2, . . . , and MPM_LIST_(K−1). Or, the at least one of the predetermined intra prediction modes, included in MPM_LIST_K may be redundant with none of the intra prediction modes included in MPM_LIST_1, MPM_LIST_2, . . . , and MPM_LIST_(K−1). For example, to substitute for the intra prediction mode excluded from MOM_LIST_K, in the presence of, among predetermined intra prediction modes, a specific intra prediction mode which is not redundant with at least one or any of the intra prediction modes included in MPM_LIST_1, MPM_LIST_2, . . . and MPM_LIST_(K−1), the specific intra prediction mode may be added to MPM_LIST_K.

For example, a predetermined intra prediction mode, MPM_LIST_K_MODE_X±delta may be included in MPM_LIST_K, while delta is continuously increased from 1 by 1 each time until the number of intra prediction modes included in MPM_LIST_K is CK. Or, the predetermined intra prediction modes may be arranged in a predetermined order, and at least one of the predetermined intra prediction modes may be included in MPM_LIST_K in the order, until the number of intra prediction modes included in MPM_LIST_K is CK.

If the intra prediction mode of the current block is derived using N MPM lists or the intra prediction mode of the current block is entropy-encoded/decoded, an indicator (MPM flag) indicating whether the intra prediction mode of the current block is included among the intra prediction modes of each of the N MPM lists may be entropy-encoded/decoded, for each of the N MPM lists.

For example, if N MPM lists are used, a maximum of N indicators may be encoded/decoded, each indicator for one MPM list, such as MPM_FLAG_1, MPM_FLAG_2, . . . MPM_FLAG_N. Or a maximum of (N−1) indicators may be encoded/decoded, and in this case, a non-encoded/decoded indicator for the other one MPM list may be derived based on a part or all of the (N−1) indicators. For example, the indicator may not be encoded/decoded for an arbitrary MPM list (e.g., the last MPM list counted in a predetermined order) among the N MPM lists. In the presence of the intra prediction mode of the current block among the intra prediction modes of a specific MPM list, the indicator may have a first value for the specific MPM list. In the absence of the intra prediction mode of the current block, the indicator may have a second value. Herein, the first value may be 1, and the second value may be 0. That is, the indicator may be flag information.

In addition, if an indicator for a specific MPM list has the first value among the N indicators, the indicators for the other MPM lists except for the indicator for the specific MPM list may have the second value.

In addition, if an indicator for a $K^{th}$ MPM list among the N indicators has the first value, the indicators for $(K+1)^{th}$ to $N^{th}$ MPM lists may not be entropy-encoded/decoded. Herein, K may be a positive integer equal to or larger than 1 and equal to or less than N.

In the presence of the same intra prediction mode as the intra prediction mode of the current block among the intra prediction modes included in a specific one of the N MPM lists, index information (an MPM index) indicating the position or number of the intra prediction mode in the specific MPM list may be entropy-encoded. In addition, the same intra prediction mode as the intra prediction mode of the current block among the intra prediction modes included in the specific MPM list may be identified by entropy-decoding the index information. The index information may be entropy-encoded to a fixed-length code or a variable-length code. In addition, the intra prediction mode of the current block may be derived, using the index information.

In the absence of the same intra prediction mode as the intra prediction mode of the current block among the intra prediction modes included in the N MPM lists, a remaining intra prediction mode of the current block may be entropy-encoded in the encoder. The remaining intra prediction mode may be used to identify the intra prediction mode of the current block that is not included in at least one of the MPM lists. Or, the remaining intra prediction mode may be used to identify the intra prediction mode of the current block that is included in none of the MPM lists.

If the total number of intra prediction modes is Y, and the sum of the numbers of intra prediction modes included in the N MPM lists for the current block is X, a remaining intra prediction mode indicating the same intra prediction mode as the intra prediction mode of the current block among (Y-X) intra prediction modes may be entropy-encoded. Herein, the total of X intra prediction modes included in the N MPM lists may be arranged based on at least one of the sizes, angles, orders, and identification numbers of the intra prediction modes. The arrangement may be made in an ascending or descending order. The arranged X intra prediction modes may be compared with the intra prediction mode of the current block. If the comparison reveals that the intra prediction mode is larger than the arranged X intra prediction modes, a predetermined value may be subtracted from the intra prediction mode of the current block. The predetermined value may be 1.

Or, for example, the intra prediction mode of the current block may be compared with a mode having the largest reference value (for example, in terms of at least one of a size, angle, order, and identification number) among the arranged X intra prediction modes. If the comparison reveals that the intra prediction mode is larger than the mode, the predetermined value may be subtracted from the intra prediction mode of the current block.

In addition, for example, the subtracted intra prediction mode of the current block may be compared with a mode having a second largest reference value among the arranged X intra prediction modes. If the comparison reveals that the subtracted intra prediction mode is larger than the mode, the predetermined value may further be subtracted from the subtracted intra prediction mode of the current block.

The comparison-based subtraction may be repeated for up to a mode having the smallest reference value among the arranged X intra prediction modes. The final subtracted intra prediction mode of the current block may be entropy-encoded as the remaining intra prediction mode.

The remaining intra prediction mode of the current block may be entropy-decoded and used to identify the same intra prediction mode as the intra prediction mode of the current block among intra prediction mode which are not included in the N MPM lists. If the total number of intra prediction modes is Y and the sum of the numbers of intra prediction modes included in the N MPM lists for the current block is X, the remaining intra prediction mode indicating the same intra prediction mode as the intra prediction mode of the current block among (Y-X) intra prediction modes may be entropy-decoded.

After the remaining intra prediction mode is entropy-decoded, the X intra prediction modes may be arranged based on at least one of the sizes, angles, orders, and identification numbers of the intra prediction modes. The arrangement may be made in an ascending or descending order. The entropy-decoded remaining intra prediction mode may be compared with the values of the X intra prediction modes. If the comparison reveals that the entropy-decoded remaining intra prediction mode is equal to or larger than the values of the X intra prediction modes, the value of the entropy-decoded remaining intra prediction mode may be increased by a predetermined value. The predetermined value may be 1.

Or, for example, a mode having the smallest reference value (e.g., in at least one of the sizes, angles, orders, and identification numbers of the intra prediction modes) among the arranged X intra prediction modes may be compared with the value of the decoded remaining intra prediction mode. If the comparison reveals that the entropy-decoded remaining intra prediction mode is equal to or larger than the value of the mode, the predetermined value may be added to the value of the entropy-decoded remaining intra prediction mode.

In addition, a mode having the second smallest reference value among the arranged X intra prediction modes may be compared with the added value of the remaining intra prediction mode. If the comparison reveals that the added remaining intra prediction mode is equal to or larger than the value of the mode, the predetermined value may further be added to the added value of the remaining intra prediction mode.

The comparison-based addition may be repeated for up to a mode having the largest reference value among the arranged X intra prediction modes. The final added remaining intra prediction mode value may be entropy-decoded as the intra prediction mode of the current block.

The intra prediction mode of the current block for which the N MPM lists are used may be entropy-encoded/decoded in the manners of the following embodiments.

A description will be given below of an embodiment for the case where one MPM list is used for a current block.

In the presence of the same intra prediction mode as the intra prediction mode of the current block among the intra prediction modes included in MPM_LIST_1, the encoder may entropy-encode the indicator MPM_FLAG_1 indicating whether the same intra prediction mode as the intra prediction mode of the current block exists in MPM_LIST_1 to a first value. If MPM_FLAG_1 is the first value, index information about MPM_LIST_1, MPM_IDX_1 may further be entropy-encoded.

In the absence of the same intra prediction mode as the intra prediction mode of the current block among the intra prediction modes included in MPM_LIST_1, the encoder may entropy-encode the indicator MPM_FLAG_1 indicating whether the same intra prediction mode as the intra prediction mode of the current block exists in MPM_LIST_1 to a second value. If MPM_FLAG_1 is the second value, the remaining intra prediction mode, REM_MODE may further be entropy-encoded.

The decoder may entropy-decode the indicator MPM_FLAG_1 indicating whether the same intra prediction mode as the intra prediction mode of the current block exists in MPM_LIST_1. If MPM_FLAG_1 is the first value, the decoder may derive the intra prediction mode of the current block by further entropy-decoding the index information about MPM_LIST_1, MPM_IDX_1.

If MPM_FLAG_1 is the second value, the decoder may derive the intra prediction mode of the current block by further entropy-decoding the remaining intra prediction mode, REM MODE.

A description will be given below of an embodiment for the case where two MPM lists are used for a current block.

In the presence of the same intra prediction mode as the intra prediction mode of the current block among the intra prediction modes included in MPM_LIST_1 and MPM_LIST_2, the encoder may entropy-encode the indicators MPM_FLAG_1 and MPM_FLAG_2 indicating which list between MPM_LIST_1 and MPM_LIST_2 includes the same intra prediction mode as the intra prediction mode of the current block. If the intra prediction mode of the current block exists in MPM_LIST_1, MPM_FLAG_1 may be the first value and MPM_FLAG_2 may be the second value. In this case, the index information about MPM_LIST_1, MPM_IDX_1 may further be entropy-encoded. Or, if the intra prediction mode of the current block exists in MPM_LIST_2, MPM_FLAG_1 may be the second value and MPM_FLAG_2 may be the first value. In this case, index information about MPM_LIST_2, MPM_IDX_2 may further be entropy-encoded.

In the absence of the same intra prediction mode as the intra prediction mode of the current block among the intra prediction modes included in MPM_LIST_1 and MPM_LIST_2, the encoder may entropy-encode the indicators MPM_FLAG_1 and MPM_FLAG_2 indicating which list between MPM_LIST_1 and MPM_LIST_2 includes the same intra prediction mode as the intra prediction mode of the current block to the second value. If MPM_FLAG_1 and MPM_FLAG_2 are the second value, the remaining intra prediction mode, REM_MODE may further be entropy-encoded.

The decoder may entropy-decode the indicators MPM_FLAG_1 and MPM_FLAG_2 indicating which list between MPM_LIST_1 and MPM_LIST_2 includes the same intra prediction mode as the intra prediction mode of the current block. If MPM_FLAG_1 is the first value and MPM_FLAG_2 is the second value, the intra prediction mode of the current block exists in MPM_LIST_1, and the decoder may derive the intra prediction mode of the current block by further entropy-decoding the index information about MPM_LIST_1, MPM_IDX_1. Or, if MPM_FLAG_1 is the second value and MPM_FLAG_2 is the first value, the intra prediction mode of the current block exists in MPM_LIST_2, and the decoder may derive the intra prediction mode of the current block by further entropy-decoding the index information about MPM_LIST_2, MPM_IDX_2. Or, if MPM_FLAG_1 and MPM_FLAG_2 are the second value, the decoder may derive the intra prediction mode of the current block by further entropy-decoding the remaining intra prediction mode, REM_MODE. Herein, the case where both MPM_FLAG_1 and MPM_FLAG_2 are the first value may not occur.

Hereinbelow, a description will be given of another embodiment for the case where two MPM lists are used for a current block.

TABLE 1

| | Descriptor |
|---|---|
| coding_unit( x0, y0, log2CbSize ) { | |
| ... | |
| MPM_FLAG_1[ x0 + i ][ y0 + j ] | ae(v) |
| if( MPM_FLAG_1[ x0 + 1 ][ y0 + j ] ) | |
| MPM_IDX_1[ x0 + i ][ y0 + j ] | ae(v) |
| else{ | |
| MPM_FLAG_2[ x0 + i ][ y0 + j ] ) | ae(v) |
| if( MPM_FLAG_2[ x0 + i ][ y0 + j ] | |
| ) | |
| MPM_IDX_2[ x0 + i ][ y0 + j ] | ae(v) |
| else | |
| REM_MODE[ x0 + i ][ y0 + j ] | ae(v) |
| } | |
| ... | |
| } | |

As in the example of [Table 1], the encoder may entropy-encode the intra prediction mode of the current block by sequentially checking whether the same intra prediction mode as the intra prediction mode of the current block exists among the intra prediction modes included in each of MPM_LIST_1 and an MPM_LIST_2 according to at least one of the orders of making the plurality of MPM lists.

For example, if the same intra prediction mode as the intra prediction mode of the current block exists in MPM_LIST_1, MPM_FLAG_1 may be entropy-encoded to the first value. Herein, the index information about MPM_LIST_1, MPM_IDX_1 may further be entropy-encoded.

For example, in the absence of the same intra prediction mode as the intra prediction mode of the current block in MPM_LIST_1, MPM_FLAG_1 may be entropy-encoded to the second value. Herein, in the presence of the same intra prediction mode as the intra prediction mode of the current block in MPM_LIST_2 (in the case where MPM_FLAG_1 is the second value), MPM_FLAG_2 may be entropy-encoded to the first value. Herein, the index information about MPM_LIST_2, MPM_IDX_2 may further be entropy-encoded.

For example, in the absence of the same intra prediction mode as the intra prediction mode of the current block in MPM_LIST_1 and MPM_LIST_2, MPM_FLAG_1 and MPM_FLAG_2 may be entropy-encoded to the second value. Herein (if MPM_FLAG_1 and MPM_FLAG_2 are the second value), the remaining intra prediction mode, REM_MODE may further be entropy-encoded.

As in the example of [Table 1], the decoder may sequentially entropy-decode the indicator MPM_FLAG_1 and/or MPM_FLAG_2 indicating which list between MPM_LIST_1 and MPM_LIST_2 includes the same intra prediction mode as the intra prediction mode of the current block in at least one of the orders of making the plurality of MPM lists.

For example, if MPM_FLAG_1 is entropy-decoded to the first value, the intra prediction mode of the current block exists in MPM_LIST_1, and may be derived by further entropy-decoding the index information about MPM_LIST_1, MPM_IDX_1.

For example, if MPM_FLAG_1 is entropy-decoded to the second value, MPM_FLAG_2 may be entropy-decoded. If the decoded MPM_FLAG_2 is the first value, the intra prediction mode of the current block exists in MPM_LIST_2, and may be derived by further entropy-decoding the index information about MPM_LIST_2, MPM_IDX_2.

For example, if MPM_FLAG_1 and MPM_FLAG_2 are entropy-decoded to the second value, the intra prediction mode of the current block may be derived by further entropy-decoding the remaining intra prediction mode, REM_MODE. Herein, the step of determining whether MPM_FLAG_1 and MPM_FLAG_2 are the first value or the second value may be performed sequentially.

Now, a description will be given of an embodiment for the case where N MPM lists are used for a current block.

In the presence of the same intra prediction mode as the intra prediction mode of the current block among the intra prediction modes included in MPM_LIST_1, MPM_LIST_2, . . . , and MPM_LIST_N, the encoder may entropy-encode the indicators MPM_FLAG_1, MPM_FLAG_2, . . . , and MPM_FLAG_N indicating which list among MPM_LIST_1, MPM_LIST_2, . . . , and MPM_LIST_N includes the same intra prediction mode as the intra prediction mode of the current block. If the intra prediction mode of the current block exists in MPM_LIST_1, MPM_FLAG_1 may be the first value, and MPM_FLAG_2, . . . , and MPM_FLAG_N except for MPM_FLAG_1 may be the second value. In this case, the index information about MPM_LIST_1, MPM_IDX_1 may further be entropy-encoded.

Or, if the intra prediction mode of the current block exists in MPM_LIST_2, MPM_FLAG_2 may be the first value and MPM_FLAG_1, . . . , and MPM_FLAG_N except for MPM_FLAG_2 may be the second value. In this case, the index information about MPM_LIST_2, MPM_IDX_2 may further be entropy-encoded.

Or, if the intra prediction mode of the current block exists in MPM_LIST_N, MPM_FLAG_N may be the first value and MPM_FLAG_1, . . . , and MPM_FLAG_(N−1) except for MPM_FLAG_N may be the second value. In this case, index information about MPM_LIST_N, MPM_IDX_N may further be entropy-encoded.

In the absence of the same intra prediction mode as the intra prediction mode of the current block among the intra prediction modes included in MPM_LIST_1, MPM_LIST_2, . . . , and MPM_LIST_N, the encoder may entropy-encode MPM_FLAG_1, MPM_FLAG_2, . . . , and MPM_FLAG_N indicating which list among MPM_LIST_1, MPM_LIST_2, . . . , and MPM_LIST_N includes the same intra prediction mode as the intra prediction mode of the current block to the second value. If MPM_FLAG_1, MPM_FLAG_2, . . . , and MPM_FLAG_N are the second value, the remaining intra prediction mode, REM_MODE may further be entropy-encoded.

The decoder may entropy-decode the indicators MPM_FLAG_1, MPM_FLAG_2, . . . , and MPM_FLAG_N indicating which list among MPM_LIST_1, MPM_LIST_2, . . . , and MPM_LIST_N includes the same intra prediction mode as the intra prediction mode of the current block. If MPM_FLAG_1 is the first value and MPM_LIST_2, . . . , and MPM_LIST_N except for MPM_FLAG_1 are the second value, the intra prediction mode of the current block may exist in MPM_LIST_1. In this case, the intra prediction mode of the current block may be derived by further entropy-decoding the index information about MPM_LIST_1, MPM_IDX_1.

Or, if MPM_FLAG_2 is the first value and MPM_LIST_1, . . . , and MPM_LIST_N except for MPM_LIST_2 are the second value, the intra prediction mode of the current block may exist in MPM_LIST_2. In this case, the intra prediction mode of the current block may be derived by further entropy-decoding the index information about MPM_LIST_2, MPM_IDX_2.

Or, if MPM_FLAG_N is the first value and MPM_LIST_1, . . . , and MPM_LIST_(N−1) except for MPM_LIST_N are the second value, the intra prediction mode of the current block may exist in MPM_LIST_N. In this case, the intra prediction mode of the current block may be derived by further entropy-decoding the index information about MPM_LIST_N, MPM_IDX_N.

Or, if MPM_FLAG_1, MPM_FLAG_2, . . . , and MPM_FLAG_N are the second value, the intra prediction mode of the current block may be derived by further entropy-decoding the remaining intra prediction mode, REM_MODE. Herein, the case where all of MPM_FLAG_1, MPM_FLAG_2, . . . , and MPM_FLAG_N are the first value may not occur.

Now, a description will be given of another embodiment for the case where N MPM lists are used for a current block.

TABLE 2

| | Descriptor |
|---|---|
| coding_unit( x0, y0, log2CbSize ) { | |
| ... | |
| MPM_FLAG_1[ x0 + i ][ y0 + j ] | ae(v) |
| if( MPM_FLAG_1[ x0 + i ][ y0 + j ] ) | |
| MPM_IDX_1[ x0 + i ][ y0 + j ] | ae(v) |
| else { | |
| MPM_FLAG_2[ x0 + i ][ y0 + j ] | ae(v) |
| if( MPM_FLAG_2[ x0 + i ][ y0 + j ] | |
| ) | |
| MPM_IDX_2[ x0 + i ][ y0 + j ] | ae(v) |
| else{ | |
| ... | |
| MPM_FLAG_N[ x0 + i ][ y0 + j ] | ae(v) |
| if( MPM_FLAG_N[ x0 + i ][ y0 + j | |
| ] | |
| MPM_IDX_N[ 0 + i ][ y0 + j ] | ae(v) |
| else | |
| REM_MODE[ x0 + i ][ y0 + j ] | ae(v) |
| } | |
| ... | |
| } | |

As in the example of [Table 2], the encoder may entropy-encode the intra prediction mode of the current block by sequentially checking whether the same intra prediction mode as the intra prediction mode of the current block exists among the intra prediction modes included in each of MPM_LIST_1, MPM_LIST_2, . . . , MPM_LIST_N according to at least one of the orders of making the plurality of MPM lists.

For example, if the same intra prediction mode as the intra prediction mode of the current block exists in MPM_LIST_1, MPM_FLAG_1 may be entropy-encoded to the first value. Herein, the index information about MPM_LIST_1, MPM_IDX_1 may further be entropy-encoded.

For example, in the absence of the same intra prediction mode as the intra prediction mode of the current block in MPM_LIST_1, MPM_FLAG_1 may be entropy-encoded to the second value. Herein, in the presence of the same intra prediction mode as the intra prediction mode of the current block in MPM_LIST_2 (in the case where MPM_FLAG_1 is the second value), MPM_FLAG_2 may be entropy-encoded to the first value. Herein, the index information about MPM_LIST_2, MPM_IDX_2 may further be entropy-encoded.

For example, in the absence of the same intra prediction mode as the intra prediction mode of the current block in MPM_LIST_1, MPM_LIST_2, . . . , MPM_LIST_(N−1), MPM_FLAG_1, MPM_FLAG_2, . . . , MPM_FLAG_(N−1) may be entropy-encoded to the second value. Herein if the same intra prediction mode as the intra prediction mode of the current block exists in MPM_LIST_N (if MPM_FLAG_1, MPM_FLAG_2, . . . , MPM_FLAG_(N−1) are the second values), the index information about MPM_LIST_N, MPM_IDX_N may further be entropy-encoded.

For example, in the absence of the same intra prediction mode as the intra prediction mode of the current block in MPM_LIST_1, MPM_LIST_2, . . . , MPM_LIST_N, MPM_FLAG_1, MPM_FLAG_2, . . . , MPM_FLAG_N may be entropy-encoded to the second value. Herein, the remaining intra prediction mode, REM_MODE may further be entropy-encoded.

As in the example of [Table 2], the decoder may sequentially entropy-decode at least one of the indicators MPM_FLAG_1, MPM_FLAG_2, . . . , MPM_FLAG_N indicating which list among MPM_LIST_1, MPM_LIST_2, . . . , MPM_LIST_N includes the same intra prediction mode as the intra prediction mode of the current block in at least one of the orders of making the plurality of MPM lists.

For example, if MPM_FLAG_1 is entropy-decoded to the first value, the intra prediction mode of the current block exists in MPM_LIST_1, and may be derived by further entropy-decoding the index information about MPM_LIST_1, MPM_IDX_1.

For example, if MPM_FLAG_1 is entropy-decoded to the second value, MPM_FLAG_2 may be entropy-decoded. If the decoded MPM_FLAG_2 is the first value, the intra prediction mode of the current block exists in MPM_LIST_2, and may be derived by further entropy-decoding the index information about MPM_LIST_2, MPM_IDX_2.

For example, if MPM_FLAG_1, MPM_FLAG_2, . . . , MPM_FLAG_(N−1) are entropy-decoded to the second value, MPM_FLAG_N may be entropy-decoded. If the decoded MPM_FLAG_N is the first value, the intra prediction mode of the current block exists in MPM_LIST_N, and may be derived by further entropy-decoding the index information about MPM_LIST_N, MPM_IDX_N.

For example, if MPM_FLAG_1, MPM_FLAG_2, . . . , MPM_FLAG_N are entropy-decoded to the second value, the intra prediction mode of the current block may be derived by further entropy-decoding the remaining intra prediction mode, REM_MODE. Herein, the step of determining whether MPM_FLAG_1, MPM_FLAG_2, . . . , MPM_FLAG_N are the first value or the second value may be performed sequentially.

A flag specifying an MPM list such as MPM_FLAG_N or an index indicating one of a plurality of MPM lists may be encoded/decoded. Information indicating whether an MPM-based intra prediction derivation method is used for a current block (or a current slice, a current picture, a current sequence, etc.) may be encoded/decoded. If the information indicates that the MPM-based intra prediction derivation method is used, the index may be encoded/decoded. At least one of the number or types of a plurality of MPM lists may be fixedly predefined in the encoder/decoder, or may be variably determined based on parameters related to the size, depth, shape, position, and so on of the current block/a neighbor block. For example, the number of MPM lists, predefined in the encoder/decoder may be 1, 2, 3, or larger. The maximum number of intra prediction modes included in each MPM list may be forced to be equal. The maximum number may be fixedly preset in the encoder/decoder, or may be signaled in a predetermined unit (e.g., a sequence, a picture, a slice, a block, etc.). If the number of intra prediction modes included in a specific MPM list is smaller than the maximum number, a predetermined mode may be added to the specific MPM list. The added mode may be a preset default mode, or an intra prediction mode included in another MPM list. Notably, a mode different from the intra prediction modes included in the specific MPM list may be added. A redundancy check between MPM lists may be omitted. One of MPM lists may share at least one same intra prediction mode with another MPM list.

Now, another embodiment for the case where N MPM lists are used for a current block will be described.

The encoder may make a plurality of MPM lists ranging from MPM_LIST_1 to MPM_LIST_N in at least one of the orders of making a plurality of MPM lists. The total number of candidate intra prediction modes in the N MPM lists may be K. N and K may be positive integers.

For example, MPM_LIST_combined may be made up of K or fewer candidate intra prediction modes out of the candidate intra prediction modes of the N MPM lists.

For example, if the same intra prediction mode as the intra prediction mode of the current block exists in MPM_LIST_combined, an indicator MPM_FLAG_combined indicating whether the same intra prediction mode as the intra prediction mode of the current block exists in MPM_LIST_combined may be entropy-encoded to a first value. Herein, index information about MPM_LIST_combined, MPM_IDX_combined may additionally be entropy-encoded.

In the absence of the same intra prediction mode as the intra prediction mode of the current block in MPM_LIST_combined, MPM_FLAG_combined may be entropy-encoded to a second value. If MPM_FLAG_combined is the second value, the remaining intra prediction mode, REM_MODE may additionally be entropy-encoded.

The decoder may entropy-decode the indicator MPM_FLAG_combined indicating whether the same intra prediction mode as the intra prediction mode of the current block exists in MPM_LIST_combined. If MPM_FLAG_combined is the first value, the intra prediction mode of the current block may be derived by further entropy-decoding the index information MPM_IDX_combined. If MPM_FLAG_combined is the second value, the intra prediction mode of the current block may be derived by additionally entropy-decoding the remaining intra prediction mode, REM_MODE.

According to the present invention, the intra prediction mode of the current block may be derived by encoding/decoding. Herein, the intra prediction mode of the current block may be entropy-encoded/decoded without using the intra prediction mode of a neighbor block. The intra-prediction mode of the current block may be induced using an intra-prediction mode of another color component. For example, when the current block is a chroma block, an intra-prediction mode of at least one relevant-luma block corresponding to the chroma target block may be used to induce an intra-prediction mode for the chroma block. Here, the relevant-luma block may be determined based on at least one of the position, size, shape, or coding parameter of the chroma block. Alternatively, the relevant-luma block may be determined based on at least one of the size, shape, or coding parameter of the luma block.

The relevant-luma block may be determined using a luma block including a sample corresponding to the central position of the chroma block, or using at least two luma blocks respectively including samples corresponding to at least two positions of chroma blocks. The at least two positions may include an upper left sample position and a center sample position.

When there are several relevant-luma blocks, a statistic value of intra-prediction modes of at least two relevant-luma blocks may be induced as the intra-prediction mode of the chroma block. Alternatively, an intra-prediction mode of a relatively large relevant-luma block may be induced as the intra-prediction mode of the chroma block. Alternatively, when the size of the luma block corresponding to a predetermined position of the chroma block is equal to or greater than the size of the chroma block, the intra-prediction mode of the chroma block may be induced using the intra-prediction mode of the relevant-luma block.

For example, when the current block is partitioned into sub-blocks, the intra-prediction mode of each of the partitioned sub-blocks may be induced using at least one method of inducing the intra-prediction mode of the current block.

Intra prediction information may be entropy-encoded/decoded from a bit stream. Herein, the intra prediction information may be signaled in at least one of a VPS, an SPS, a PPS, an APS, a slice header, and a tile header.

A flag indicating whether an MPM is matched: e.g.) prev_intra_luma_pred_flag

An index indicating a position in an MPM list: e.g.) mpm_idx intra luma prediction mode information: e.g.) rem_intra_luma_pred_mode intra chroma prediction mode information: e.g.) intra_chroma_pred_mode A flag indicating that the intra prediction modes of the current block and the sub-blocks are derived using the intra prediction mode of a neighbor block: e.g.) NDIP_flag An indicator (MPM flag) indicating, for each of N MPM lists, whether the same intra prediction mode as the intra prediction mode of the current block is included among the intra prediction modes of the MPM list, when the intra prediction mode of the current block is derived or entropy-encoded/decoded using the N MPM lists: e.g.) MPM_FLAG_1, MPM_FLAG_2, MPM_FLAG_N Index information indicating, when the same intra prediction mode as the intra prediction mode of the current block is included among the intra prediction modes of a specific one of the N MPM lists, the position or sequence of the intra prediction mode in the MPM list: e.g.) MPM_IDX_1, MPM_IDX_2, . . . , MPM_IDX_N When an MPM (Most Probable Mode) flag is 1, an intra prediction mode of a luma component may be derived from candidate modes including intra modes of adjacent units having been already encoded/decoded by using an MPM index mpm_idx.

When the MPM (Most Probable Mode) flag is 0, the intra prediction mode of the luma component may be encoded/decoded by using intra prediction mode information on luma component rem_intra_luma_pred_mode.

An intra prediction mode of a chroma component may be encoded/decoded by using intra prediction mode information on chroma component intra_chroma_pred_mode and/or a corresponding intra prediction mode of a chroma component block.

The intra prediction information may be entropy-encoded/decoded from a bitstream based on at least one of coding parameters. For example, NDIP_flag may be encoded/decoded based on block division information.

For example, if at least one of split_flag, quadtree_flag, and binarytree_flag is '0' and thus a block is not further divided, NDIP_flag may be encoded/decoded. For example, if binarytree_flag is 1, NDIP_flag may not be encoded/decoded.

At least one of the above-described pieces of intra prediction information may not be signaled based on at least one of the size and shape of the block.

For example, if the size of the current block is a predetermined size, at least one piece of intra prediction information about the current block may not be signaled, and at least one piece of information about intra prediction corresponding to the size of a previously encoded/decoded upper level block may be used. For example, if the current block is shaped into a rectangle, at least one piece of intra prediction information about the current block may not be signaled, and at least one piece of information about intra prediction corresponding to the size of a previously encoded/decoded upper level block may be used.

When at least one of the pieces of intra prediction information is entropy-encoded/decoded, at least one of the following binarization methods may be used.

Truncated Rice binarization method

K-th order Exp_Golomb binarization method

Limited K-th order Exp_Golomb binarization method

Fixed-length binarization method

Unary binarization method

Truncated Unary binarization method

Now, a detailed description will be given of the reference sample construction step S520.

In intra prediction of the current block or a sub-block having a smaller size and/or shape than the current block based on the derived intra prediction mode, a reference sample may be constructed for the prediction. The following description is given in the context of the current block, and the current block may mean a sub-block. The reference sample may be constructed, using one or more reconstructed samples or sample combinations neighboring to the current block. Additionally, filtering may be applied in constructing the reference sample. Herein, the reference sample may be constructed using each reconstructed sample on a plurality of reconstructed sample lines, as it is. Or, the reference sample may be constructed after filtering between samples on the same reconstructed sample line. Or, the reference sample may be constructed after filtering between samples on different reconstructed sample lines. The constructed reference sample may be denoted by ref[m, n], and a reconstructed neighbor sample or a sample obtained by filtering the reconstructed neighbor sample may be denoted by rec[m, n]. Herein, m or n may be a predetermined integer value. In the case where the current block is of size W(horizontal)×H(vertical), if a left uppermost sample position of the current block is (0, 0), a relative position of a left uppermost reference sample closest to the sample position may be set to (−1, −1).

Figure 7:
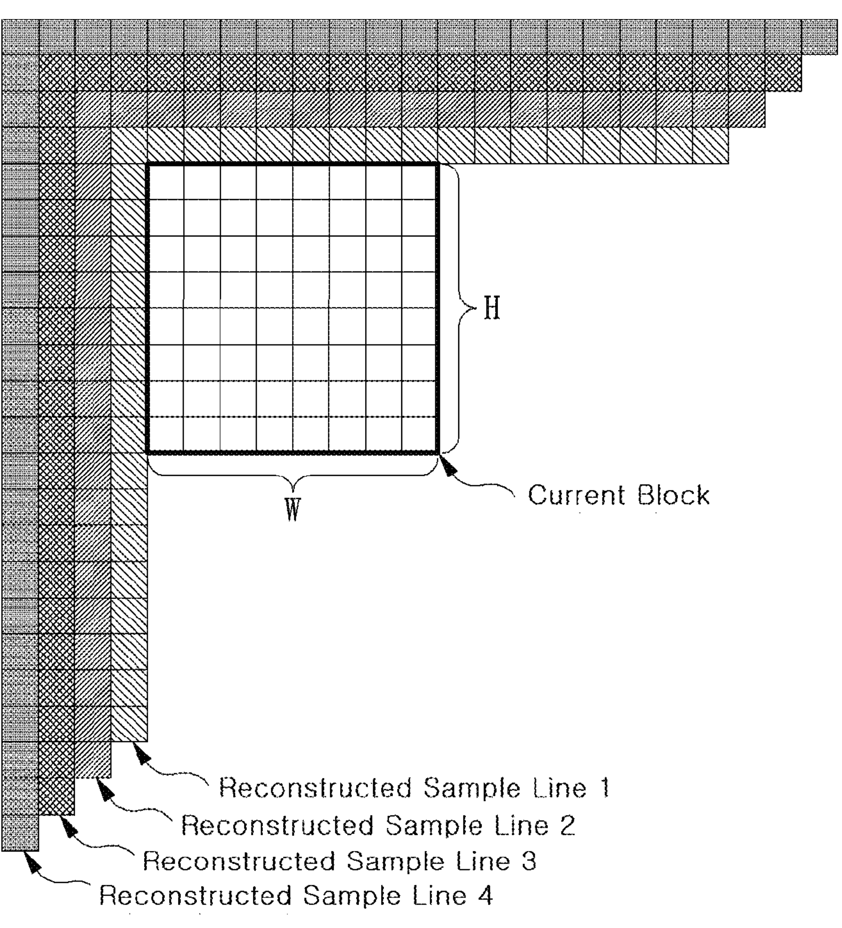
FIG. 7 is an exemplary view depicting neighbor reconstructed sample lines which may be used for intra prediction of a current block.

FIG. 7 is an exemplary view depicting neighbor reconstructed sample lines which may be used for intra prediction of a current block.

As illustrated in FIG. 7, a reference sample may be constructed using one or more reconstructed sample lines adjacent to the current block.

For example, one of a plurality of reconstructed sample lines illustrated in FIG. 7 may be selected, and a reference sample may be constructed using the selected reconstructed sample line. A predetermined one of the plurality of reconstructed sample lines may be fixedly selected as the selected reconstructed sample line. Or, a specific one of the plurality of reconstructed sample lines may be adaptively selected as the selected reconstructed sample line. In this case, an indicator for the selected reconstructed sample line may be signaled.

For example, a reference sample may be constructed using one or more of the plurality of reconstructed sample lines illustrated in FIG. 7 in combination. For example, a reference sample may be constructed as a weighted sum (or weighted mean) of one or more reconstructed samples. Weights used for the weighted sum may be assigned based on distances from the current block. Herein, a larger weight may be assigned for a shorter distance to the current block. For example, the following [Equation 1] may be used.

[Equation 1]

$$ref[-1,-1] = (rec[-2,-1] + 2*rec[-1,-1] + rec[-1,-2] + 2) \gg 2$$

$$ref[x,-1] = (rec[x,-2] + 3*rec[x,-1] + 2) \gg 2, (x = 0 \sim W + H - 1)$$

$$ref[-1,y] = (rec[-2,y] + 3*rec[-1,y] + 2) \gg 2, (y = 0 \sim W + H - 1)$$

Or, a reference sample may be constructed using at least one of the mean value, maximum value, minimum value, median value, and most frequent value of a plurality of reconstructed samples based on at least one of distances from the current block or intra prediction modes.

Or, a reference sample may be constructed based on a change (variation) in the values of a plurality of contiguous reconstructed samples. For example, a reference sample may be constructed based on at least one of whether the difference between the values of two contiguous reconstructed samples is equal to or larger than a threshold, whether the values of the two contiguous reconstructed samples are changed continuously or non-continuously, and so on. For example, if the difference between rec[−1, −1] and rec[−2, −1] is equal to or larger than a threshold, ref[−1, −1] may be determined to be rec[−1, −1], or a value obtained by applying a weighted mean with a predetermined weight assigned to rec[−1, −1]. For example, if as a plurality of contiguous reconstructed samples are nearer to the current bloc, the values of the plurality of contiguous reconstructed samples are changed by n each time, a reference sample, ref[−1, −1] may be determined to be rec[−1, −1]-n.

At least one among the number and positions of reconstructed sample lines and a constructing method used for constructing the reference sample may be determined differently according to whether an upper or left boundary of the current block corresponds to a boundary of at least one among a picture, a slice, a tile and a Coding Tree Block (CTB).

For example, in constructing a reference sample using reconstructed sample lines 1 and 2, when the upper boundary of the current block corresponds to a CTB boundary, reconstructed sample line 1 may be used for the upper side and reconstructed sample lines 1 and 2 may be used for the left side.

For example, in constructing a reference sample using reconstructed sample lines 1 to 4, when the upper boundary of the current block corresponds to a CTB boundary, reconstructed sample lines 1 and 2 may be used for the upper side and reconstructed sample lines 1 to 4 may be used for the left side.

For example, in constructing a reference sample using reconstructed sample line 2, when the upper boundary of the current block corresponds to a CTB boundary, reconstructed sample line 1 may be used for the upper side and reconstructed sample lines 1 and 2 may be used for the left side.

One or more reference sample lines may be constructed through the above process.

A reference sample constructing method of the upper side of the current block may be different from that of the left side.

Information indicating that a reference sample has been constructed using at least one method among the above methods may be encoded/decoded. For example, information indicating whether a plurality of reconstructed sample lines are used may be encoded/decoded.

If the current block is divided into a plurality of sub-blocks, and each sub-block has an independent intra prediction mode, a reference sample may be constructed for each sub-block.

FIG. 8 is a view depicting an embodiment of constructing a reference sample for a sub-block included in a current block.

As illustrated in FIG. 8, if the current block is of size 16×16 and 16 4×4 sub-blocks have independent intra prediction modes, a reference sample for each sub-block may be constructed in at least one of the following methods according to a scanning scheme for predicting a sub-block.

For example, a reference sample may be constructed for each sub-block, using N reconstruction sample lines neighboring to the current block. In the example illustrated in FIG. 8, N is 1.

For example, in the case where a plurality of sub-blocks are predicted in a raster scan order of 1→2→3→ . . . 15→16, a reference sample for a Kth sub-block may be constructed, using a sample of at least one of already encoded/decoded left, top, top right, and bottom left sub-blocks.

For example, in the case where a plurality of sub-blocks are predicted in a Z scan order of 1→2→5→6→3→4→7→ . . . 12→15→16, a reference sample for a Kth sub-block may be constructed, using a sample of at least one of already encoded/decoded left, top, top right, and bottom left sub-blocks.

For example, in the case where a plurality of sub-blocks are predicted in a zig-zag scan order of 1→2→5→9→6→3→4→ . . . 12→15→16, a reference sample for a Kth sub-block may be constructed, using a sample of at least one of already encoded/decoded left, top, top right, and bottom left sub-blocks.

For example, in the case where a plurality of sub-blocks are predicted in a vertical scan order of 1→5→9→13→2→6→ . . . 8→12→16, a reference sample for a Kth sub-block may be constructed, using a sample of at least one of already encoded/decoded left, top, top right, and bottom left sub-blocks.

In the case where a plurality of sub-blocks are predicted in a scan order other than the above scan orders, a reference sample for a Kth sub-block may be constructed, using a sample of at least one of already encoded/decoded left, top, top right, and bottom left sub-blocks.

In selecting the reference sample, a decision as to the availability of a block including the reference sample and/or padding may be performed. For example, if the block including the reference sample is available, the reference sample may be used. Meanwhile, if the block including the reference sample is not available, the unavailable reference sample may be replaced with one or more available neighbor reference samples by padding.

If the reference sample exists outside at least one of a picture boundary, a tile boundary, a slice boundary, a CTB boundary, and a predetermined boundary, it may be determined that the reference sample is not available.

In the case where the current block is encoded by CIP (constrained intra prediction), if the block including the reference sample is encoded/decoded in an inter prediction mode, it may be determined that the reference sample is not available.

Figure 9:
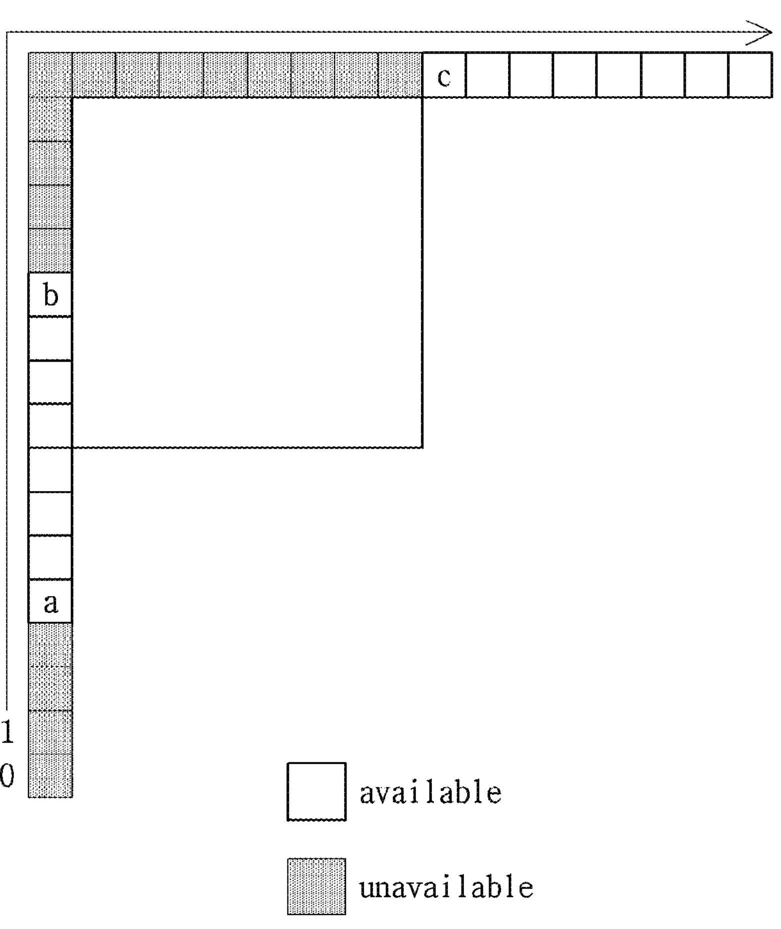
FIG. 9 is a view depicting a method for replacing an unavailable reconstructed sample, using an available reconstructed sample.

FIG. 9 is a view depicting a method for replacing an unavailable reconstructed sample, using an available reconstructed sample.

If it is determined that the neighbor reconstructed sample is unavailable, the unavailable sample may be replaced, using a neighbor available reconstructed sample. For example, as illustrated in FIG. 9, in the presence of available samples and unavailable samples, an unavailable sample may be replaced, using one or more available samples.

The sample value of an unavailable sample may be replaced with the sample value of an available sample in a predetermined order. An available sample adjacent to an unavailable sample may be used to replace the unavailable sample. In the absence of an adjacent available sample, the first appearing available sample or the closest available sample may be used. A replacement order of unavailable samples may be a left lowermost to right uppermost order. Or the replacement order of unavailable samples may be a right uppermost to left lowermost order. Or the replacement order of unavailable samples may be a left uppermost to right uppermost and/or left lowermost order. Or the replacement order of unavailable samples may be a right uppermost and/or left lowermost to left uppermost order.

As illustrated in FIG. 9, unavailable samples may be replaced in an order from a left lowermost sample position 0 to a right uppermost sample. In this case, the values of the first four unavailable samples may be replaced with the value of the first appearing or closest available sample a. The values of the next 13 unavailable samples may be replaced with the value of the last available sample b.

Or, an unavailable sample may be replaced, using a combination of available samples. For example, the unavailable sample may be replaced using the mean value of available samples adjacent to both ends of the unavailable sample. For example, in FIG. 9, the first four unavailable samples may be filled with the value of the available sample a, and the next 13 unavailable samples may be filled with the mean value of the available sample b and an available sample c. Or, the 13 unavailable samples may be filled with any value between the values of the available samples b and c. In this case, the unavailable samples may be replaced with difference values. For example, as an unavailable sample is nearer to the available sample a, the value of the unavailable sample may be replaced with a value close to the value of the available sample a. Similarly, as an unavailable sample is nearer to the available sample b, the value of the unavailable sample may be replaced with a value close to the value of the available sample b. That is, the value of an unavailable sample may be determined based on the distance from the unavailable sample to the available sample a and/or b.

To replace an unavailable sample, one or more of a plurality of methods including the above methods may be selectively applied. A method for replacing an unavailable sample may be signaled by information included in a bitstream, or a method predetermined by an encoder and a decoder may be used. Or the method for replacing an unavailable sample may be derived by a predetermined scheme. For example, a method for replacing an unavailable sample may be selected based on the difference between the values of the available samples a and b and/or the number of unavailable samples. For example, a method for replacing an unavailable sample may be selected based on a comparison between the difference between the values of two available samples and a threshold and/or a comparison between the number of unavailable samples and a threshold. For example, if the difference between the values of the two available samples is larger than the threshold and/or if the number of unavailable samples is larger than the threshold, the values of unavailable samples may be replaced with different values.

For the constructed one or more reference samples, it may be determined whether to apply filtering according to at least one of the intra prediction mode, size, and shape of the current block. If the filtering is applied, a different filter type may be used according to at least one of the intra prediction mode, size, and shape of the current block.

For example, for each of the plurality of reference sample lines, whether filtering is applied and/or a filter type may be determined differently. For example, filtering may be applied to a first neighbor line, whereas filtering may not be applied to a second neighbor line. For example, both a filtered value and a non-filtered value may be used for the reference sample. For example, among 3-tap filter, 5-tap filter and 7-tap filter, at least one may be selected and applied according to at least intra prediction mode, size and shape of a block.

Hereinbelow, the step of performing intra prediction (S530) will be described in detail.

Intra prediction may be performed for the current block or a sub-block based on the derived intra prediction mode and reference sample. In the following description, the current block may mean a sub-block.

For example, non-directional intra prediction may be performed. The non-directional intra prediction mode may be at least one of the DC mode and the Planar mode.

Intra prediction in the DC mode may be performed using the mean value of one or more of the constructed reference samples. Filtering may be applied to one or more prediction samples at the boundary of the current block. The DC-mode intra prediction may be performed adaptively according to at least one of the size and shape of the current block.

Figure 10:
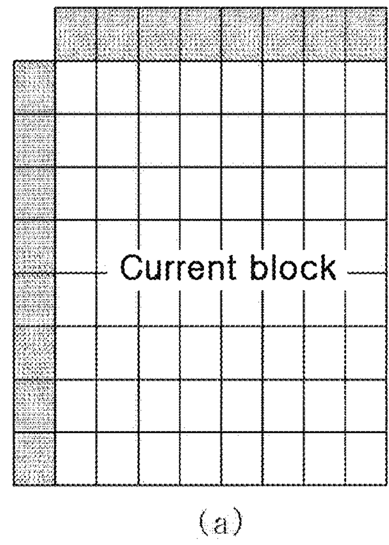
FIG. 10 is an exemplary view illustrating intra prediction according to shapes of a current block.
Figure 10:
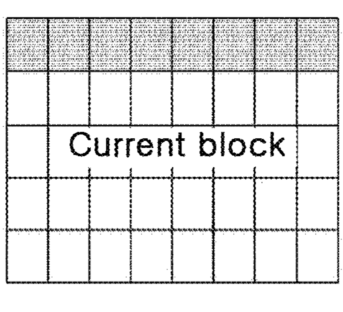

FIG. 10 is an exemplary view illustrating intra prediction according to shapes of a current block.

For example, as illustrated in (a) of FIG. 10, if the current block is shaped into a square, the current block may be predicted using the mean value of reference samples above and to the left of the current block.

For example, as illustrated in (b) of FIG. 10, if the current block is shaped into a rectangle, the current block may be predicted using the mean value of reference samples neighboring to the longer between the width and length of the current block.

For example, if the size of the current block falls within a predetermined range, predetermined samples are selected from among the top or left reference samples of the current block, and prediction may be performed using the mean value of the selected samples.

Planar-mode intra prediction may be performed by calculating a weighted sum in consideration of distances from the one or more constructed reference samples according to the positions of target intra prediction samples of the current block.

For example, a prediction block may be calculated to be a weighted sum of N reference samples dependent on the position (x, y) of a target prediction sample. N may be a positive integer, for example, 4.

For example, directional intra prediction may be performed. The directional prediction mode may be at least one of a horizontal mode, a vertical mode, and a mode having a predetermined angle.

Horizontal/vertical-mode intra prediction may be performed using one or more reference samples on a horizontal/vertical line at the position of a target intra prediction sample.

Intra prediction in a mode having a predetermined angle may be performed using one or more reference samples on a line at the predetermined angle with respect to the position of a target intra prediction sample. Herein, N reference samples may be used. N may be a positive integer such as 2, 3, 4, 5, or 6. Further, for example, prediction may be performed by applying an N–tap filter such as a 2-tap, 3-tap, 4-tap, 5-tap, or 6-tap filter.

For example, intra prediction may be performed based on position information. The position information may be encoded/decoded, and a reconstruction sample block at the position may be derived as an intra prediction block for the current block. Or a block similar to the current block, detected by the decoder may be derived as an intra prediction block for the current block.

For example, an intra color component prediction may be performed. For example, intra prediction may be performed for a chroma component using a reconstruction luma component of the current block. Or, intra prediction may be performed for another chroma component Cr using one reconstruction chroma component Cb of the current block.

Intra prediction may be performed by using one or more of the afore-described various intra prediction methods in combination. For example, an intra prediction block may be constructed for the current block through a weighted sum of a block predicted using a predetermined non-directional intra prediction mode and a block predicted using a predetermined directional intra prediction mode. Herein, a different weight may be applied according to at least one of the intra prediction mode, block size, shape/and or sample position of the current block.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

What is claimed is:

1. An image decoding method performed by an image decoding apparatus, the image decoding method comprising:

receiving information related to an intra prediction mode;

deriving a Most Probable Mode (MPM) list based on intra prediction modes of neighboring blocks adjacent to a current block; and performing intra prediction on the current block based on the MPM list and the information related to the intra prediction mode, wherein the information related to the intra prediction mode includes index information specifies one of intra prediction modes in the MPM list, wherein the MPM list comprises an intra prediction mode of a left block adjacent to the current block, an intra prediction mode of an upper block adjacent to the current block, and two or more additional MPM candidates, wherein the two or more additional MPM candidates are derived based on a minimum value and a maximum value of (i) a mode value of the intra prediction mode of the left block and (ii) a mode value of the intra prediction mode of the upper block, wherein the current block is divided into a plurality of sub-blocks, and wherein an intra prediction mode for the plurality of sub-blocks is derived based on the MPM list.

2. An image encoding method performed by an image encoding apparatus, the image encoding method comprising:

deriving a Most Probable Mode (MPM) list based on intra prediction modes of neighboring blocks adjacent to a current block;

performing intra prediction on the current block based on the MPM list; and encoding image information including information related to an intra prediction mode, wherein the information related to the intra prediction mode includes index information specifies one of intra prediction modes in the MPM list, wherein the MPM list comprises an intra prediction mode of a left block adjacent to the current block, an intra prediction mode of an upper block adjacent to the current block, and two or more additional MPM candidates, wherein the two or more additional MPM candidates are derived based on a minimum value and a maximum value of (i) a mode value of the intra prediction mode of the left block and (ii) a mode value of the intra prediction mode of the upper block, wherein the current block is divided into a plurality of sub-blocks, and wherein an intra prediction mode for the plurality of sub-blocks is derived based on the MPM list.

3. A method for transmitting for image data, the method comprising:

obtaining a bitstream of encoded image information, wherein the encoded image information is generated based on deriving a Most Probable Mode (MPM) list based on intra prediction modes of neighboring blocks adjacent to a current block, performing intra prediction on the current block based on the MPM list, and encoding image information including information related to an intra prediction mode; and transmitting the image data comprising the bitstream, wherein the information related to the intra prediction mode includes index information specifies one of intra prediction modes in the MPM list, wherein the MPM list comprises an intra prediction mode of a left block adjacent to the current block, an intra prediction mode of an upper block adjacent to the current block, and two or more additional MPM candidates, wherein the two or more additional MPM candidates are derived based on a minimum value and a maximum value of (i) a mode value of the intra prediction mode of the left block and (ii) a mode value of the intra prediction mode of the upper block, wherein the current block is divided into a plurality of sub-blocks, and wherein an intra prediction mode for the plurality of sub-blocks is derived based on the MPM list.

* * * * *